United States Patent
Yabe

(10) Patent No.: US 8,521,098 B2
(45) Date of Patent: Aug. 27, 2013

(54) RECEIVING APPARATUS, TRANSMITTING APPARATUS, RECEIVING METHOD, TRANSMITTING METHOD, COMMUNICATIONS SYSTEM, AND COMMUNICATION METHOD

(75) Inventor: Atsushi Yabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 13/217,900

(22) Filed: Aug. 25, 2011

(65) Prior Publication Data

US 2011/0306309 A1  Dec. 15, 2011

Related U.S. Application Data

(63) Continuation of application No. PCT/JP2009/055451, filed on Mar. 19, 2009.

(51) Int. Cl.
*H04B 1/00* (2006.01)

(52) U.S. Cl.
USPC .............................. 455/72; 704/500; 704/503

(58) Field of Classification Search
USPC ................... 455/72; 704/500, 503; 375/240
See application file for complete search history.

(56) References Cited

U.S. PATENT DOCUMENTS

| | | | | |
|---|---|---|---|---|
| 5,754,589 A * | 5/1998 | Maitra et al. | | 375/216 |
| 5,864,577 A * | 1/1999 | Ramel | | 375/130 |
| 7,313,152 B2 * | 12/2007 | Westphal | | 370/468 |
| 7,330,902 B1 * | 2/2008 | Bergenwall et al. | | 709/232 |
| 8,111,704 B2 * | 2/2012 | Singhal et al. | | 370/401 |
| 8,311,060 B2 * | 11/2012 | Chen et al. | | 370/473 |
| 2002/0059464 A1 | 5/2002 | Hata et al. | | |
| 2002/0142730 A1 * | 10/2002 | Hsu | | 455/72 |
| 2004/0073711 A1 | 4/2004 | Pelletier et al. | | |
| 2006/0245352 A1 | 11/2006 | Kang et al. | | |
| 2007/0216546 A1 * | 9/2007 | Iwasaki et al. | | 341/50 |
| 2008/0008175 A1 * | 1/2008 | Park | | 370/390 |
| 2008/0084851 A1 | 4/2008 | Kim et al. | | |
| 2008/0212566 A1 * | 9/2008 | Kim et al. | | 370/352 |
| 2008/0285463 A1 * | 11/2008 | Oran | | 370/241 |
| 2010/0208655 A1 | 8/2010 | Kim et al. | | |
| 2010/0234908 A1 * | 9/2010 | Didon | | 607/5 |

FOREIGN PATENT DOCUMENTS

| | | |
|---|---|---|
| JP | 2004-194232 | 7/2004 |
| JP | 2005-057323 | 3/2005 |
| JP | 2005-229378 | 8/2005 |
| JP | 2006-287284 | 10/2006 |
| JP | 2006-333407 | 12/2006 |

OTHER PUBLICATIONS

Japanese International Preliminary Report on Patentability with Written Opinion attached, issued for corresponding International Patent Application No. PCT/JP2009/055451, mailed Oct. 27, 2011. English translation attached.
Notice of Preliminary Rejection issued for corresponding Korean Patent Application No. 10-2011-7020322, mailed Mar. 21, 2013 with English translation.
International Search Report issued for corresponding International Patent Application No. PCT/JP2009/055451, mailed Jun. 2, 2009.
3GPP TS 36.323 V8.3.0 (Sep. 2008); 3rd Generation Partnership Project; Technical Specification Group Radio Access Network; Evolved Universal Terrestrial Radio Access (E-UTRA); Packet Data Convergence Protocol (PDCP) specification (Release 8); Dated Sep. 2008.

* cited by examiner

*Primary Examiner* — Dominic E Rego
(74) *Attorney, Agent, or Firm* — Myers Wolin, LLC

(57) ABSTRACT

A receiving apparatus in a communications system that performs header compression of audio data and has a plurality of operation modes that each have a different frequency of header compression, the receiving apparatus includes: a receiver that receives the audio data, which is transmitted from a transmitting apparatus that performs the header compression; a processor that controls the receiving apparatus in accordance with the process includes: determining a voice-communication state of the received audio data; and changing the operation mode, according to a determination result.

15 Claims, 29 Drawing Sheets

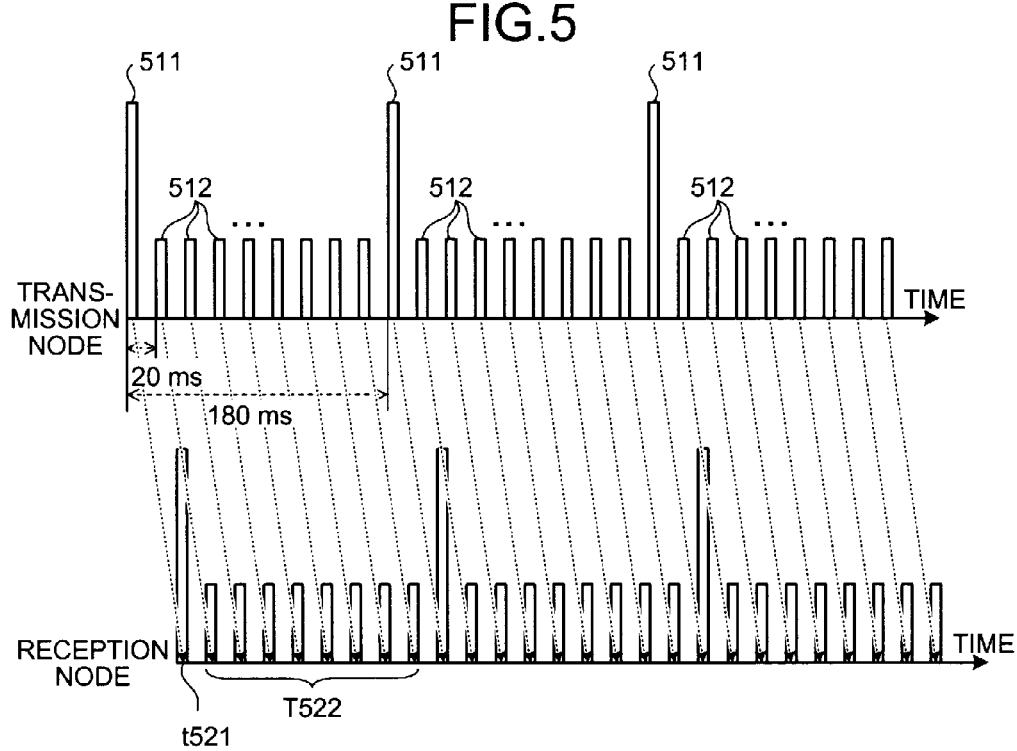
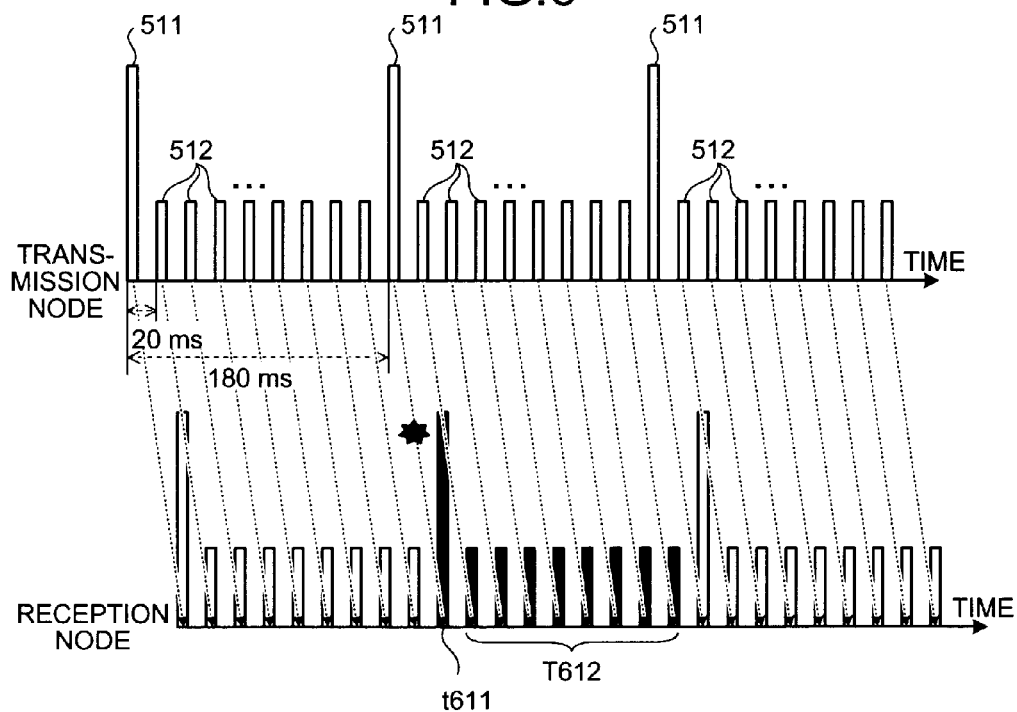

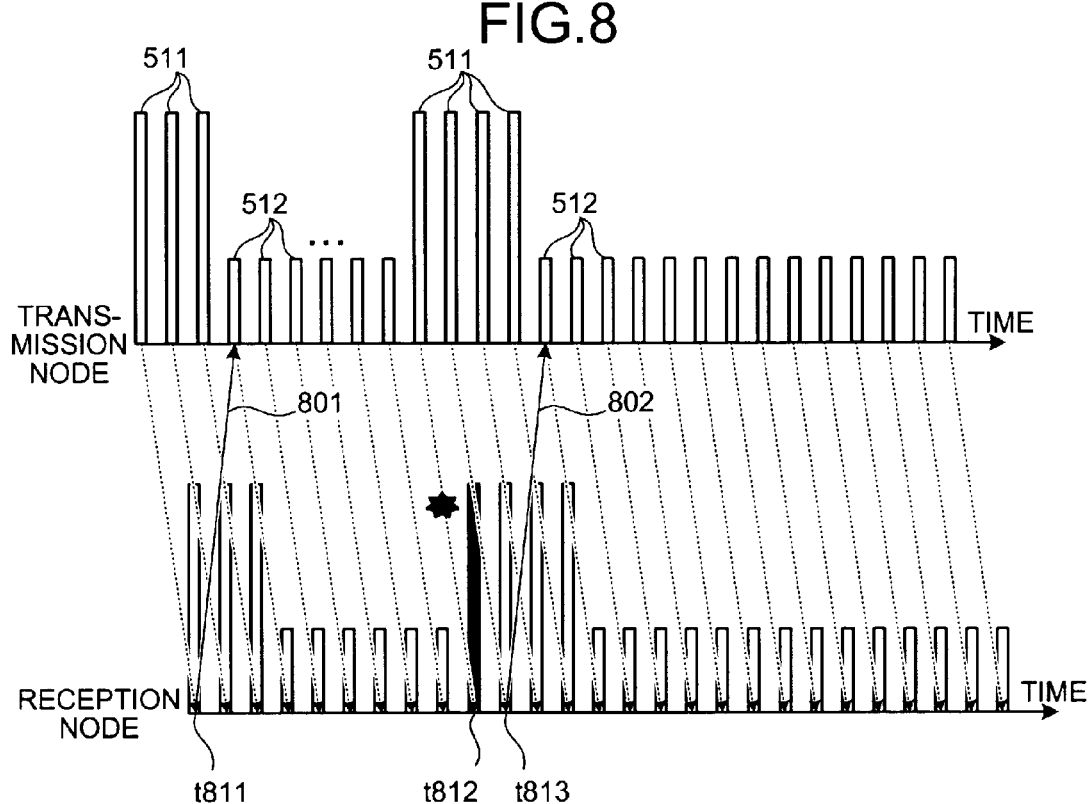
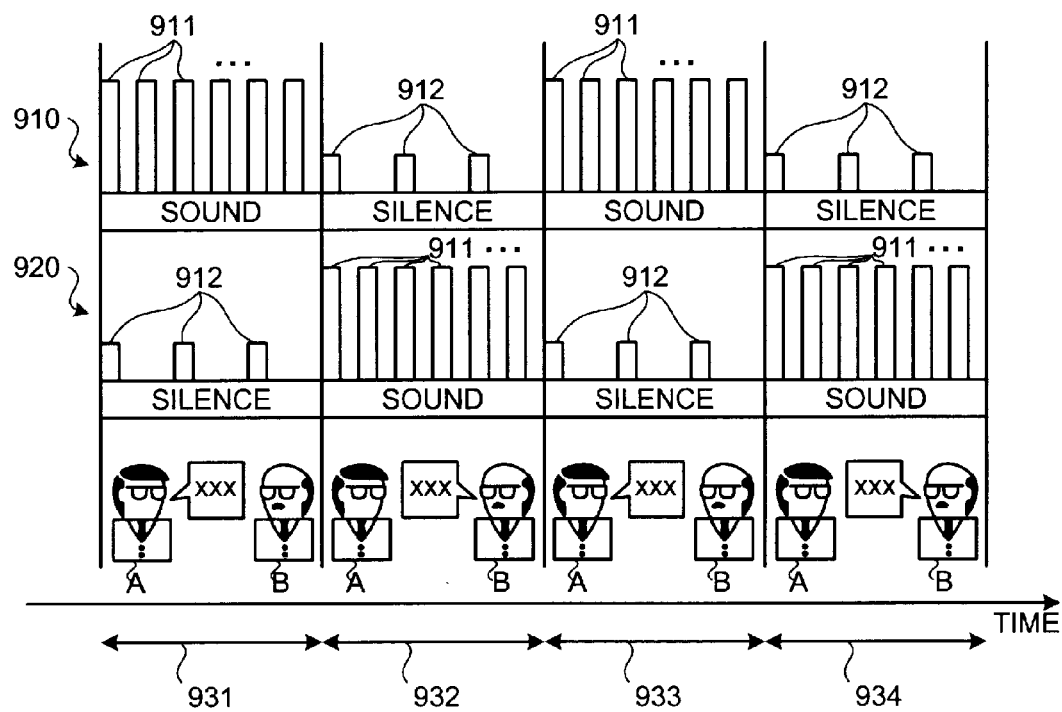

FIG.14

| INDEX | BUFFER SIZE (BS) [Bytes] | | | | INDEX | BUFFER SIZE (BS) [Bytes] | | | |
|---|---|---|---|---|---|---|---|---|---|
| 0 |  | BS | = | 0 | 32 | 1132 | < | BS | ≤ | 1326 |
| 1 | 0 | < | BS | ≤ | 10 | 33 | 1326 | < | BS | ≤ | 1552 |
| 2 | 10 | < | BS | ≤ | 12 | 34 | 1552 | < | BS | ≤ | 1817 |
| 3 | 12 | < | BS | ≤ | 14 | 35 | 1817 | < | BS | ≤ | 2127 |
| 4 | 14 | < | BS | ≤ | 17 | 36 | 2127 | < | BS | ≤ | 2490 |
| 5 | 17 | < | BS | ≤ | 19 | 37 | 2490 | < | BS | ≤ | 2915 |
| 6 | 19 | < | BS | ≤ | 22 | 38 | 2915 | < | BS | ≤ | 3413 |
| 7 | 22 | < | BS | ≤ | 26 | 39 | 3413 | < | BS | ≤ | 3995 |
| 8 | 26 | < | BS | ≤ | 31 | 40 | 3995 | < | BS | ≤ | 4677 |
| 9 | 31 | < | BS | ≤ | 36 | 41 | 4677 | < | BS | ≤ | 5476 |
| 10 | 36 | < | BS | ≤ | 42 | 42 | 5476 | < | BS | ≤ | 6411 |
| 11 | 42 | < | BS | ≤ | 49 | 43 | 6411 | < | BS | ≤ | 7505 |
| 12 | 49 | < | BS | ≤ | 57 | 44 | 7505 | < | BS | ≤ | 8787 |
| 13 | 57 | < | BS | ≤ | 67 | 45 | 8787 | < | BS | ≤ | 10287 |
| 14 | 67 | < | BS | ≤ | 78 | 46 | 10287 | < | BS | ≤ | 12043 |
| 15 | 78 | < | BS | ≤ | 91 | 47 | 12043 | < | BS | ≤ | 14099 |
| 16 | 91 | < | BS | ≤ | 107 | 48 | 14099 | < | BS | ≤ | 16507 |
| 17 | 107 | < | BS | ≤ | 125 | 49 | 16507 | < | BS | ≤ | 19325 |
| 18 | 125 | < | BS | ≤ | 146 | 50 | 19325 | < | BS | ≤ | 22624 |
| 19 | 146 | < | BS | ≤ | 171 | 51 | 22624 | < | BS | ≤ | 26487 |
| 20 | 171 | < | BS | ≤ | 200 | 52 | 26487 | < | BS | ≤ | 31009 |
| 21 | 200 | < | BS | ≤ | 234 | 53 | 31009 | < | BS | ≤ | 36304 |
| 22 | 234 | < | BS | ≤ | 274 | 54 | 36304 | < | BS | ≤ | 42502 |
| 23 | 274 | < | BS | ≤ | 321 | 55 | 42502 | < | BS | ≤ | 49759 |
| 24 | 321 | < | BS | ≤ | 376 | 56 | 49759 | < | BS | ≤ | 58255 |
| 25 | 376 | < | BS | ≤ | 440 | 57 | 58255 | < | BS | ≤ | 68201 |
| 26 | 440 | < | BS | ≤ | 515 | 58 | 68201 | < | BS | ≤ | 79846 |
| 27 | 515 | < | BS | ≤ | 603 | 59 | 79846 | < | BS | ≤ | 93479 |
| 28 | 603 | < | BS | ≤ | 706 | 60 | 93479 | < | BS | ≤ | 109439 |
| 29 | 706 | < | BS | ≤ | 826 | 61 | 109439 | < | BS | ≤ | 128125 |
| 30 | 826 | < | BS | ≤ | 967 | 62 | 128125 | < | BS | ≤ | 150000 |
| 31 | 967 | < | BS | ≤ | 1132 | 63 | 150000 | < | BS | | |

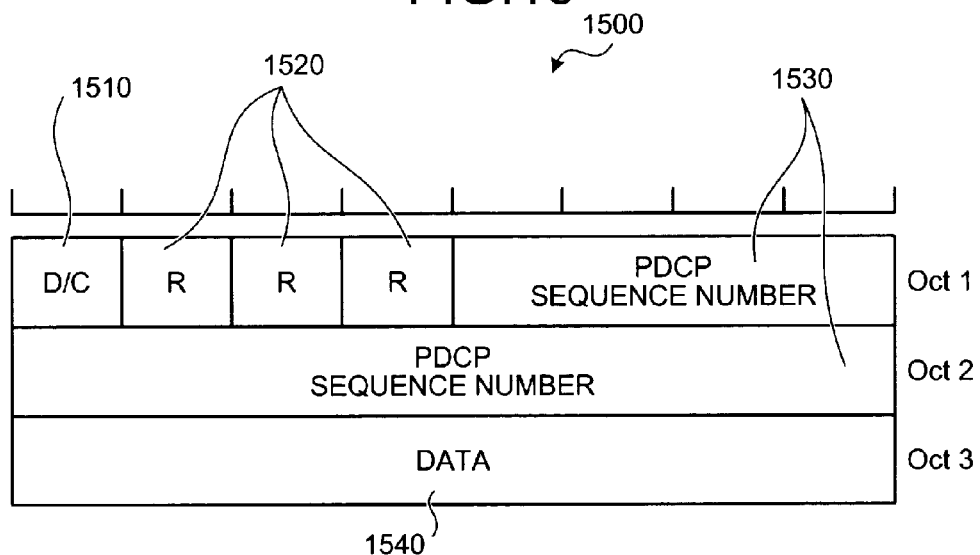
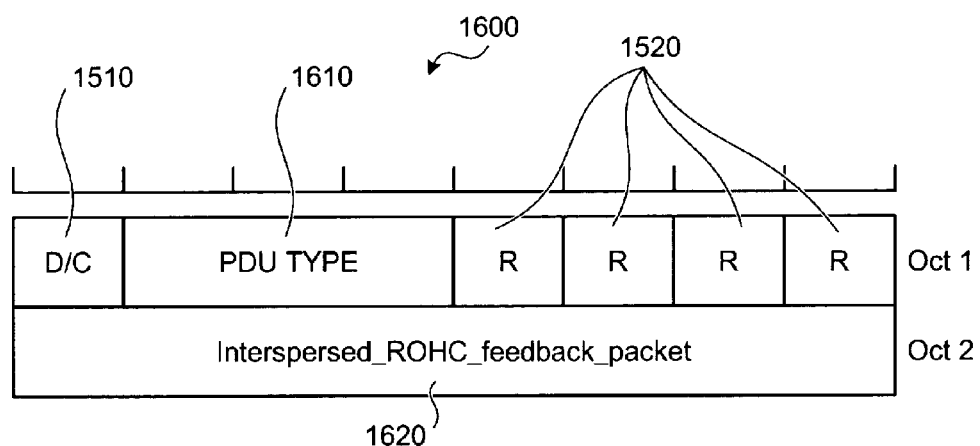

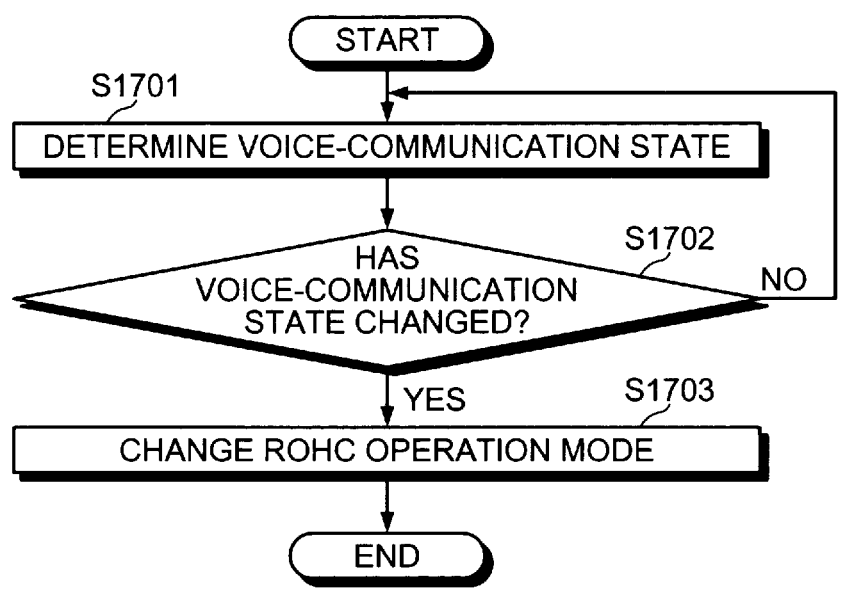

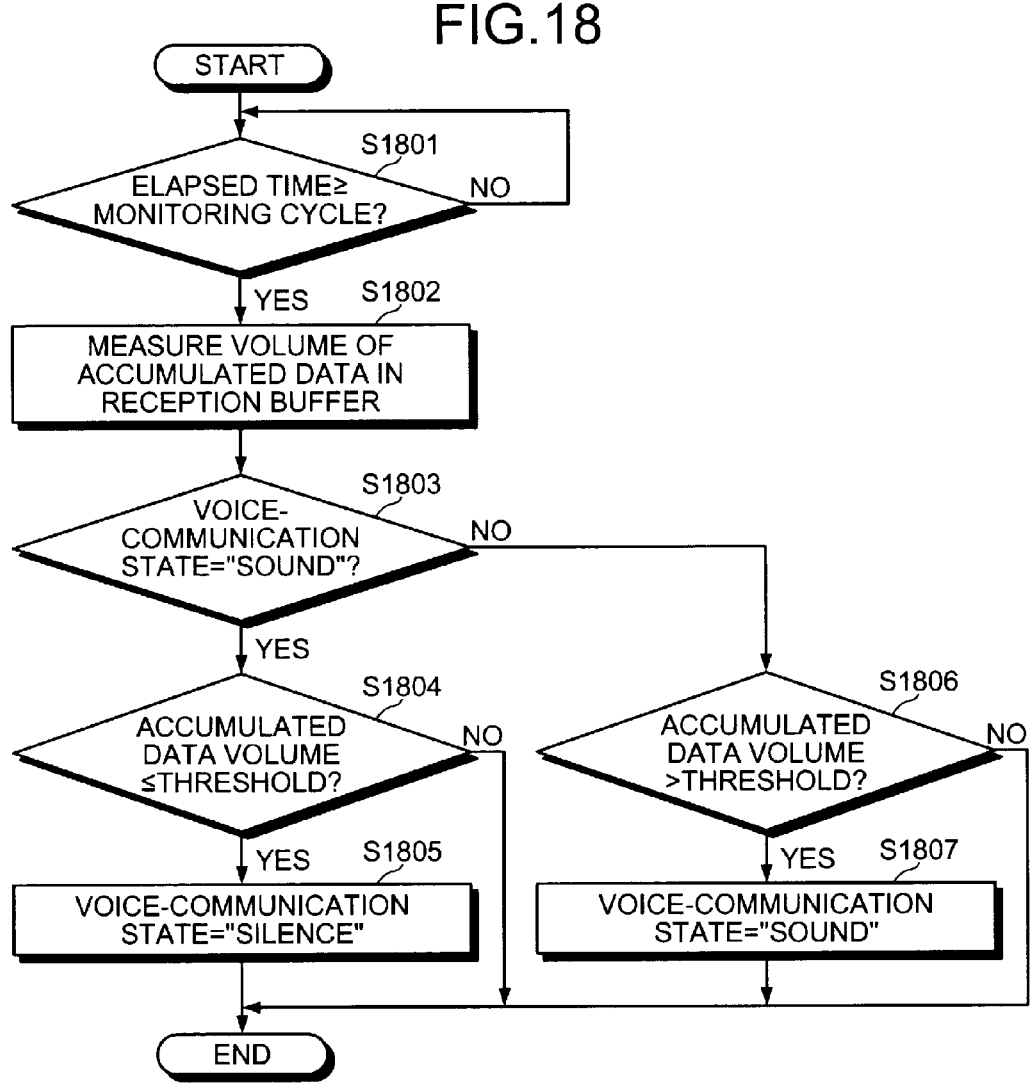

RECEIVING APPARATUS, TRANSMITTING APPARATUS, RECEIVING METHOD, TRANSMITTING METHOD, COMMUNICATIONS SYSTEM, AND COMMUNICATION METHOD

CROSS REFERENCE TO THE RELATED APPLICATIONS

This is a continuation application of International Application PCT/JP2009/055451, filed Mar. 19, 2009, now pending, the entire contents of which are incorporated herein by reference.

FIELD

The embodiments discussed herein are related to a receiving apparatus, a transmitting apparatus, a receiving method, a transmitting method, a communications system, and a communication method that perform audio communication.

BACKGROUND

Long Term Evolution (LTE) systems aim to improve performance by leaps and bounds from 3G cellular systems and under the 3rd Generation Partnership Project (3GPP), advances are being made toward international standardization. LTE systems realize high speed transmission in mobile communication, provide high speed service environments such as high speed image delivery, and are expected to facilitate efficient frequency utilization.

Further, although in existing systems (3G), audio and data communication have been provided by separate communication infrastructures, in LTE systems, movement towards "all IP" integrating audio and data communication to an IP base is intended, whereby completely IP-based systems are expected to be realized by LTE systems, from systems that include conventional circuit switching infrastructure.

Real-time data transmission in LTE systems, similar to Voice over IP (VoIP) in typical wired IP networks, is implemented by RTP/UDP/IP protocols. Consequently, real-time data in LTE systems have large overhead due to the headers appended for each protocol.

In networks that include wireless intervals of limited bandwidth, to improve the bandwidth utilization efficiency of the wireless intervals, a function to compress the protocol headers, which cause overhead, is demanded. This header compression function is expected to be realized in LTE systems.

For example, a technique called Robust Header Compressing (ROHC) included in a Packet Data Convergence Protocol (PDCP) between eNB and UE is expected to implement header compression. Multiple operation modes, each having a different header compression efficiency exist in ROHC (see, for example, Japanese Laid-Open Patent Publication No. 2002-135362).

SUMMARY

According to an aspect of an embodiment, a receiving apparatus in a communications system that performs header compression of audio data and has a plurality of operation modes that each have a different frequency of header compression, the receiving apparatus includes: a receiver that receives the audio data, which is transmitted from a transmitting apparatus that performs the header compression; a processor that controls the receiving apparatus in accordance with the process includes: determining a voice-communication state of the received audio data; and changing the operation mode, according to a determination result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram of U-mode operation of ROHC (part 1).
FIG. 6 is a diagram of the U-mode operation of ROHC (part 2).
FIG. 8 is a diagram of R-mode operation of ROHC.
FIG. 9 is a diagram of an example of a change in the voice-communication state.
FIG. 14 is a diagram of a buffer size index.
FIG. 15 is a diagram of a data PDU format.
FIG. 16 is a diagram of an example of control PDU format.
FIG. 17 is a flowchart of an example of operation of the reception node depicted in FIG. 1.
FIG. 18 is a flowchart of step S1701 depicted in FIG. 17.

DESCRIPTION OF EMBODIMENTS

Preferred embodiments of the present invention will be explained with reference to the accompanying drawings.

Figure 1:
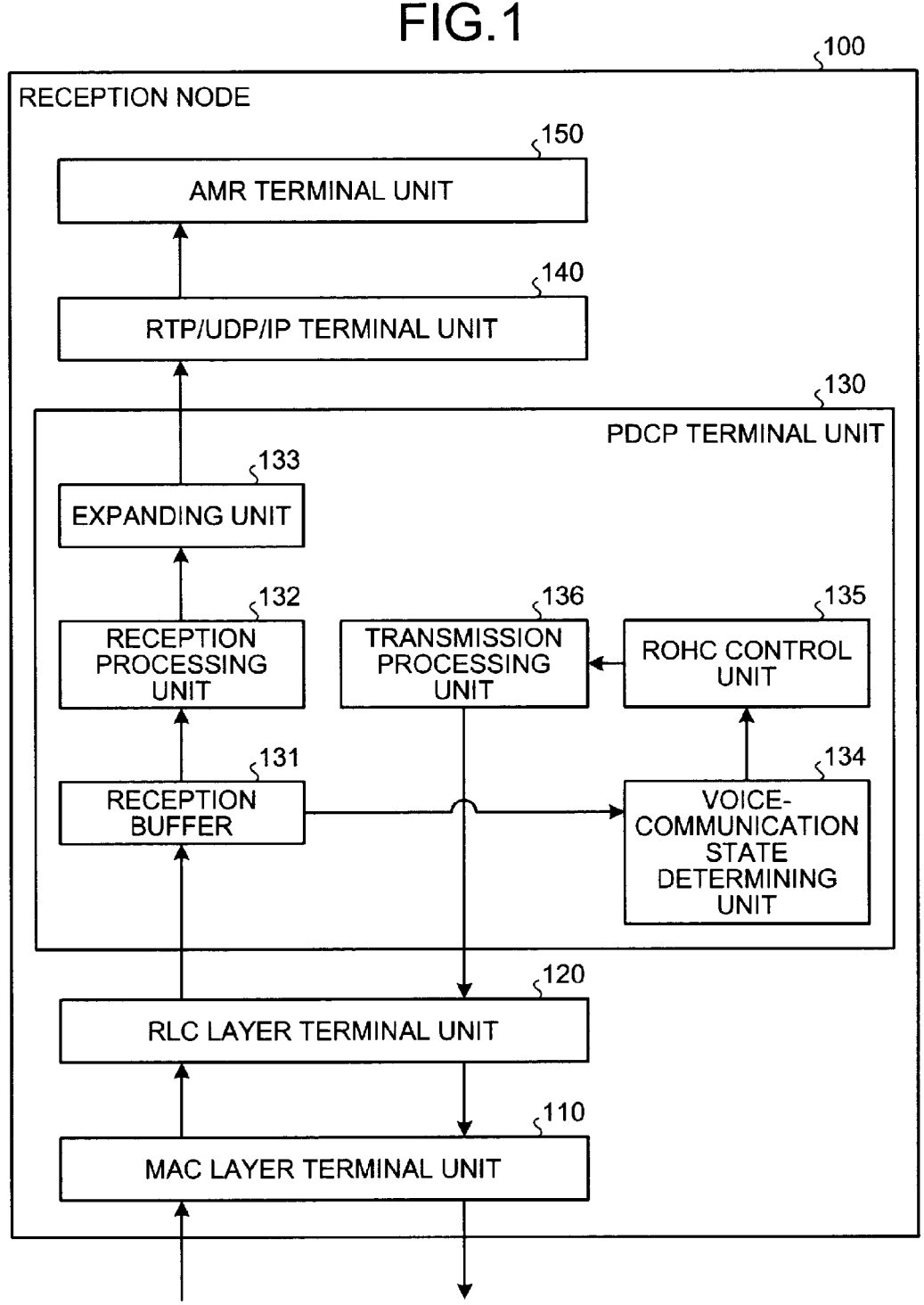
FIG. 1 is a block diagram of an example of configuration of a reception node according to a first embodiment.

FIG. 1 is a block diagram of an example of configuration of a reception node according to a first embodiment. A reception node 100 depicted in FIG. 1 is an example of application of the receiving apparatus according to the embodiment, to user equipment (UE) such as a user terminal in an LTE system. The reception node 100 includes a MAC layer terminal unit 110, an RLC layer terminal unit 120, a PDCP terminal unit 130, an RTP/UDP/IP terminal unit 140, and an AMR terminal unit 150.

Figure 2:
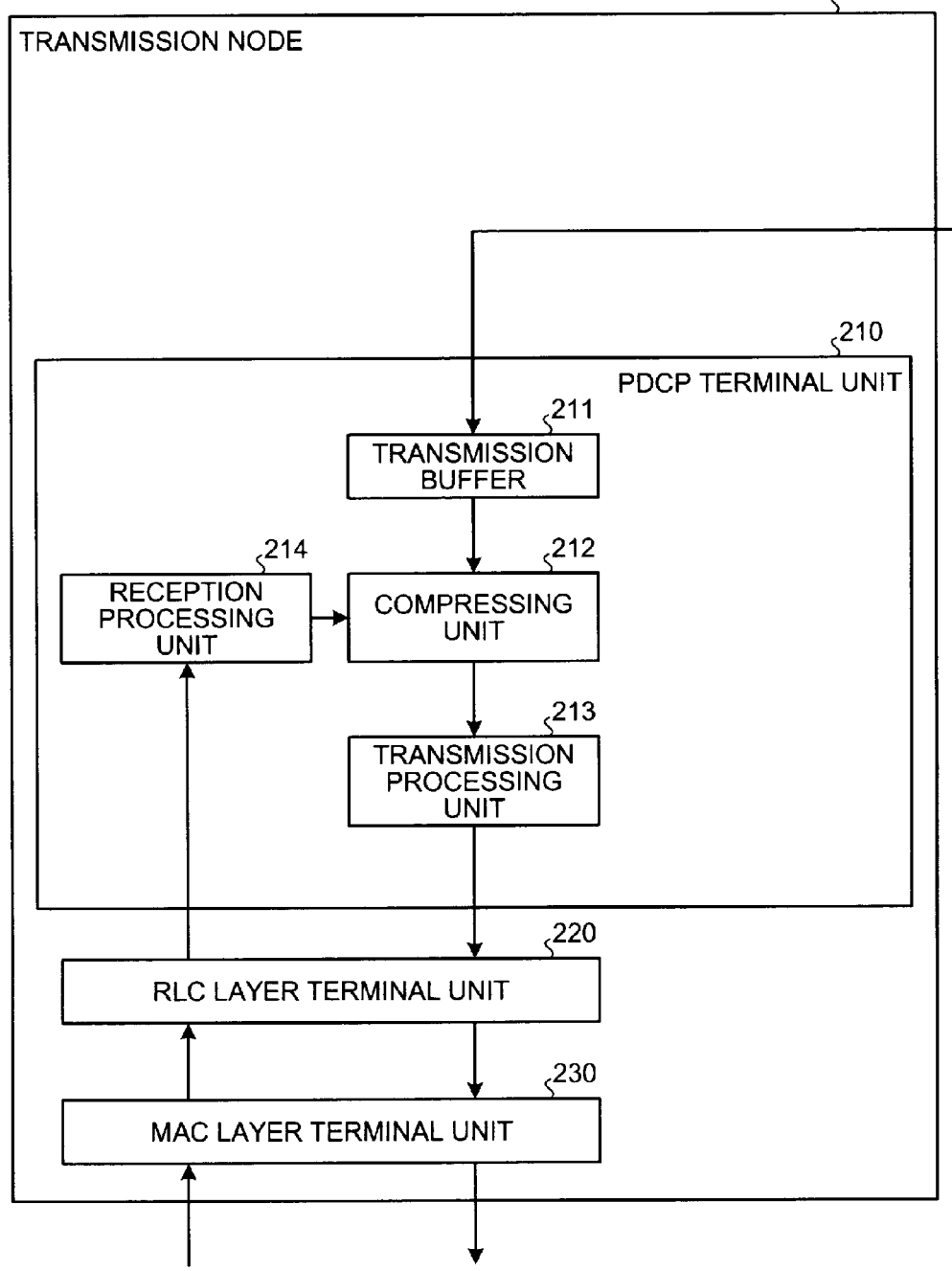
FIG. 2 is a block diagram of an example of configuration of a transmission node according to the first embodiment.

The MAC layer terminal unit 110 is a terminus of a MAC layer in the communication with the transmission node (see FIG. 2). For example, the MAC layer terminal unit 110 corrects errors and controls retransmission of audio data or control data transmitted from the transmission node. The RLC layer terminal unit 120 is a terminus of an RLC layer in the communication with the transmission node.

The PDCP terminal unit 130 is a terminus of a PDCP layer in the communication with the transmission node. Further, the PDCP terminal unit 130 is a terminus of the ROHC layer in the communication with the transmission node. For example, the PDCP terminal unit 130 includes a reception buffer 131, a reception processing unit 132, an expanding unit 133, a voice-communication state determining unit 134, an ROHC control unit 135, and a transmission processing unit 136.

The reception buffer 131 temporarily stores PDCP_PDU received through the MAC layer terminal unit 110 and the RLC layer terminal unit 120. The reception processing unit 132 (receiving unit) reads out the PDCP_PDU stored in the reception buffer 131, performs header processing on the PDCP_PDU, and outputs the PDCP_PDU to the expanding unit 133. The PDCP_PDU readout by the reception processing unit 132 is erased from the reception buffer 131.

The expanding unit 133 expands the ROHC header of the data output from the reception processing unit 132 and outputs the data to the RTP/UDP/IP terminal unit 140. The expanding unit 133 expands the ROHC header according to the operation mode, which is changed by the ROHC control unit 135.

The voice-communication state determining unit 134 (determining unit) determines the voice-communication state of the audio data received by the reception node 100 from the transmission node and notifies the ROHC control unit 135 of the determination results. A voice-communication state is, for example, a state related to whether the audio of the audio data is "sound" or "silence". The voice-communication state determining unit 134, for example, determines the voice-communication state, based on the volume of accumulated data in the reception buffer 131.

For example, if the volume of accumulated data in the reception buffer 131 is greater than a threshold, the voice-communication state determining unit 134 determines the voice-communication state to be "sound", and if the volume of accumulated data in the reception buffer 131 is equal to or less than the threshold, the voice-communication state determining unit 134 determines the voice-communication state to be "silence". The threshold to which the volume of accumulated data is compared is, for example, a value corresponding to the size of silence insertion descriptor (SID) data transmitted from the transmission node when the voice-communication state is "silence".

The ROHC control unit 135 (control unit) changes the ROHC operation mode in the reception node 100 and transmission node, according to the determination results output from the voice-communication state determining unit 134. For example, the ROHC control unit 135 changes the ROHC operation mode in the reception node 100 and transmission node to any one among a U-mode, an O-mode, and an R-mode. These ROHC operations are described hereinafter (refer to FIGS. 5 to 8).

To change the ROHC operation mode, the ROHC control unit 135 generates a change instructing signal that indicates the operation mode to be changed to. The ROHC control unit 135 outputs the generated change instructing signal to the transmission processing unit 136. Consequently, the change instructing signal is transmitted to the transmission node and the ROHC mode is changed.

The transmission processing unit 136 appends PDCP_PDU headers. For example, the transmission processing unit 136 appends headers to the change instructing signal output from the ROHC control unit 135 and outputs the change instructing signal to the transmission node through the MAC layer terminal unit 110 and the RLC layer terminal unit 120.

The RTP/UDP/IP terminal unit 140 is a terminus of an RTP/UDP/IP layer in the communication with the transmission node. The AMR terminal unit 150 is a terminus of an AMR layer in the communication with the transmission node. For example, the AMR terminal unit 150 decodes audio data received from the transmission node.

In FIG. 1, a function related to the downlink of audio data transmitted from the transmission node (eNB) and received by the reception node 100 (UE) has been described. However, the reception node 100 may have a function related to an uplink of audio data transmitted by the reception node 100 (UE) to the transmission node (eNB).

The voice-communication state determining unit 134 depicted in FIG. 1 writes the results of the voice-communication state determination to memory (not depicted) of the reception node 100. The voice-communication state determining unit 134, for example, is a computing unit such as a central processing unit (CPU). The ROHC control unit 135 reads the determination results written to the memory of the reception node 100 by the voice-communication state determining unit 134 and according to the read determination results, changes the ROHC operation mode. The ROHC control unit 135 is, for example, a computing unit such as a CPU.

FIG. 2 is a block diagram of an example of configuration of the transmission node according to the first embodiment. A transmission node 200 depicted in FIG. 2 is an example of application of the transmitting apparatus according to the embodiment, to an eNB in the LTE system. The transmission node 200 includes a PDCP terminal unit 210, an RLC layer terminal unit 220, and a MAC layer terminal unit 230.

The PDCP terminal unit 210 is a terminus of the PDCP layer in the communication with the reception node 100. The PDCP terminal unit 210 is further a terminus of the ROHC layer in the communication with the reception node 100. For example, the PDCP terminal unit 210 includes a transmission buffer 211, a compressing unit 212, a transmission processing unit 213, and a reception processing unit 214.

The transmission buffer 211 temporarily stores PDCP_SDU transmitted from an upper system (e.g., S-GW_IF) of the transmission node 200. The compressing unit 212 reads out the PDCP_SDU stored in the transmission buffer 211, compresses the header, and outputs the PDCP_SDU to the transmission processing unit 213.

The PDCP_SDU read out by the compressing unit 212 is deleted from the transmission buffer 211. Further, the compressing unit 212 compresses the header according to the ROHC operation mode set in the transmission node 200. For example, the compressing unit 212 acquires from the reception processing unit 214, the change instructing signal for the ROHC operation mode, received from the reception node 100, and compresses the header according to the operation mode indicated by the change instructing signal.

The transmission processing unit 213 appends a PDCP header to the PDCP_SDU output from the compressing unit 212 and outputs the resulting PDCP_SDU as a PDCP_PDU to the reception node 100, through the RLC layer terminal unit 220 and the MAC layer terminal unit 230. The reception processing unit 214 processes the header of a PDCP_PDU received from the reception node 100 through the RLC layer terminal unit 220 and the MAC layer terminal unit 230.

For example, the reception processing unit 214 processes the header of a change instructing signal received from the reception node 100 and outputs the change instructing signal to the compressing unit 212. The RLC layer terminal unit 220 is a terminus of the RLC layer in the communication with the reception node 100. The MAC layer terminal unit 230 is a terminus of the MAC layer in the communication with the reception node 100.

In FIG. 2, a function related to the downlink of audio data transmitted from the transmission node 200 (eNB) and received by the reception node 100 (UE) has been described. However, the transmission node 200 may have a function related to an uplink of audio data transmitted by the reception node 100 (UE) to the transmission node 200 (eNB).

Figure 3:
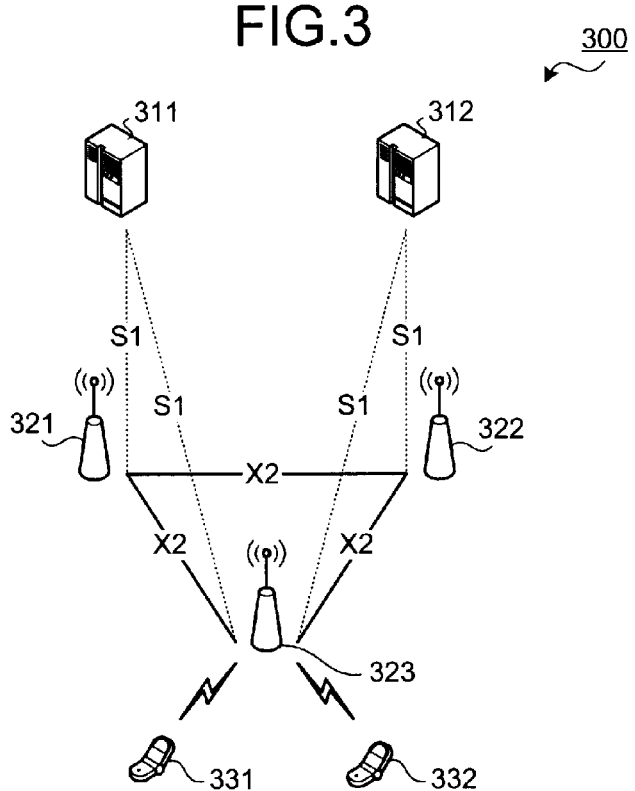
FIG. 3 is a diagram of an example of configuration of a communications system according to the first embodiment.

FIG. 3 is a diagram of an example of configuration of a communications system according to the first embodiment. A communications system 300 depicted in FIG. 3 is an example of application of the communications system according to the embodiment, to an LTE system. The communications system 300 includes MME/S-GWs 311, 312; eNBs 321-323; and UE 331, 332.

The MME/S-GWs 311, 312 respectively include a mobility management entity (MME) function and a serving gateway (S-GW) function in the LTE system. The MME/S-GWs 311, 312 are respectively connected to the eNBs 321-323 by an S1 interface.

The eNBs 321-323 are respectively an LTE system E-UTRAN_NodeB and are connected by an X2 interface. Further, the eNBs 321-323 respectively perform audio communication with each of the UE 331, 332 by wireless communication. The UE 331, 332 are respectively mobile terminals such as a mobile telephone.

The reception node 100 depicted in FIG. 1, for example, can be applied to at least one of the UE 331, 332. Further, the transmission node 200 depicted in FIG. 2, for example, can be applied to at least one of the eNBs 321-323.

Further, the reception node 100 depicted in FIG. 1 may be applied to at least one of the eNBs 321-323; and the transmission node 200 depicted in FIG. 2 may be applied to at least one of the UE 331, 332. In this case, the PDCP terminal unit 130 of the reception node 100 depicted in FIG. 1 is connected to an upper system (e.g., S-GW_IF) and the transmission node 200 depicted in FIG. 2 includes the RTP/UDP/IP terminal unit 140 and the AMR terminal unit 150 (see FIG. 1).

Figure 4:
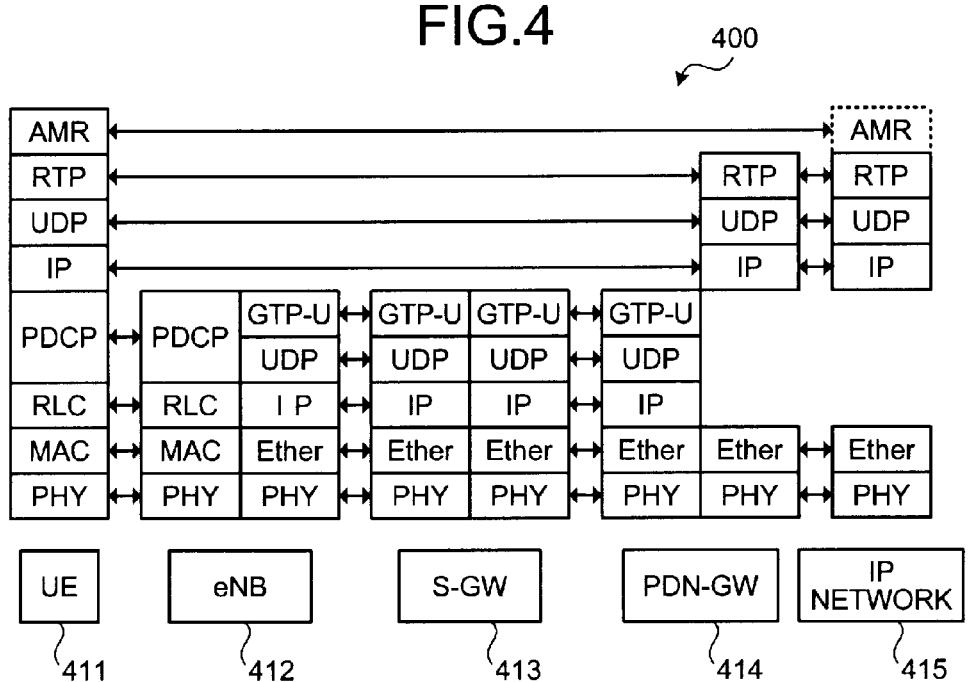
FIG. 4 is a diagram of a protocol stack in the communications system depicted in FIG. 3.

FIG. 4 is a diagram of a protocol stack in the communications system depicted in FIG. 3. In the communications system 300 depicted in FIG. 3, for example, a protocol stack 400 depicted in FIG. 4 is applied. The protocol stack 400 depicted in FIG. 4 is a protocol stack related to IP-based real-time data, such as in audio communications, and under investigation under LTE.

In FIG. 4, UE 411 is the UE 331, 332 depicted in FIG. 3. eNB 412 is the eNBs 321-323 depicted in FIG. 3. S-GW 413 is the MME/S-GWs 311, 312 depicted in FIG. 3. PDN-GW 414 and an IP network 415 are connected to the MME/S-GWs 311, 312 depicted in FIG. 3.

In the protocol stack 400, "PHY" and "Ether" represent a physical layer (Physical) and an Ethernet (registered trademark), respectively. "PHY" and "Ether" use interfaces compliant as a basic rate interface of a local area network (LAN) and of a wide area network (WAN).

"IP" (Internet Protocol) is Layer 3 used on the Internet. "IP" provides a data routing function. "UDP" (User Datagram Protocol) is a connectionless transfer protocol. "RTP" (Real-time Transport Protocol) provides framework for real-time media transfer. "RTP" uses application-specific profiles and payload formats.

"GTP-U" (GPRS Tunneling Protocol) tunnels user data in LTE/SAE networks. "MAC" (Medium Access Control) performs scheduling, priority control, error correction by Hybrid Automatic Repeat Request (HARQ), selection of transformat, etc.

"RLC" (Radio Link Control) performs error correction by Automatic Repeat Request (ARQ), etc. "PDCP" (Packet Data Convergence Protocol) performs header compression (ROHC), etc.

Taking the downlink (eNB→UE) as an example, in audio data (AMR) transmitted from the IP network 415 side, via RTP/UDP/IP, the RTP/UDP/IP header is compressed by ROHC, a function of the PDCP terminated in the eNB 412. For audio data that has been transferred to the UE 411 and whose header has been compressed, when the PDCP is terminated in the UE 411, the header is expanded by ROHC and the original audio data is recovered.

FIG. 5 is a diagram of U-mode operation of ROHC (part 1). In FIG. 5, the horizontal axis represents time. An example will be described where at the RTP/UDP/IP layer, the transmission node 200 transmits audio data to the reception node 100 by a 20[msec]-cycle frame. An uncompressed frame 511 is audio data (including context) transmitted by the transmission node 200, without header compression. A compressed frame 512 is audio data (including context) that has a compressed header and is transmitted by the transmission node 200.

A dimension along a direction perpendicular to the horizontal axis of the uncompressed frame 511 and the compressed frame 512 (the vertical direction in the figure) indicates frame size. Since the header has been compressed, the size of the compressed frame 512 is smaller than that of the uncompressed frame 511 whose header has not been compressed. In this example, the ROHC operation mode for the reception node 100 and the transmission node 200 is the U-mode (Unidirectional Mode).

For example, the transmission node 200 transmits a frame every 20[msec] and among the transmitted frames, frames transmitted at 180[msec] intervals are regarded as an uncompressed frame 511 while other frames are regarded as compressed frames 512.

The reception node 100 receives the frames while expanding (recovering) the headers of the compressed frames 512, based on the context included in the previously received uncompressed frame 511. For example, based on the context included in the uncompressed frame 511 received at period t521, the reception node 100 expands the header of the compressed frames 512 received during interval T522 immediately subsequent to period t521.

In this manner, in the ROHC U-mode, the transmission node transmits context at given intervals, whereby communication quality is assured. In this case, feedback requesting context (the uncompressed frame 511) from the reception node 100 is performed, whereby band of the link from the reception node 100 to the transmission node 200 is not under pressure.

FIG. 6 is a diagram of U-mode operation of ROHC (part 2). In FIG. 6, parts identical to those depicted in FIG. 5 are given the same reference numerals used in FIG. 5 and description thereof is omitted. In this example, it is assumed that the operation mode of ROHC is the U-mode (see FIG. 5) and that at period t611, an uncompressed frame 511 is properly received by the reception node 100.

In this example, concerning the compressed frames 512 received during interval T612, which is immediately subsequent to period t611, frames have been discarded at the PDCP layer and header expansion cannot be properly performed. Consequently, the compressed frames 512 received during internal T612 result in data loss and sound quality is degraded. In this case, for example, audio is temporarily interrupted.

The interval during which the compressed frames 512 result in data loss continues until the reception node 100 subsequently receives the uncompressed frame 511 and the context is recovered. Consequently, the interval during which the compressed frames 512 result in data loss is dependent upon the cycle (here, 180[msec]) at which the transmission node 200 transmits the context (the uncompressed frame 511).

Figure 7:
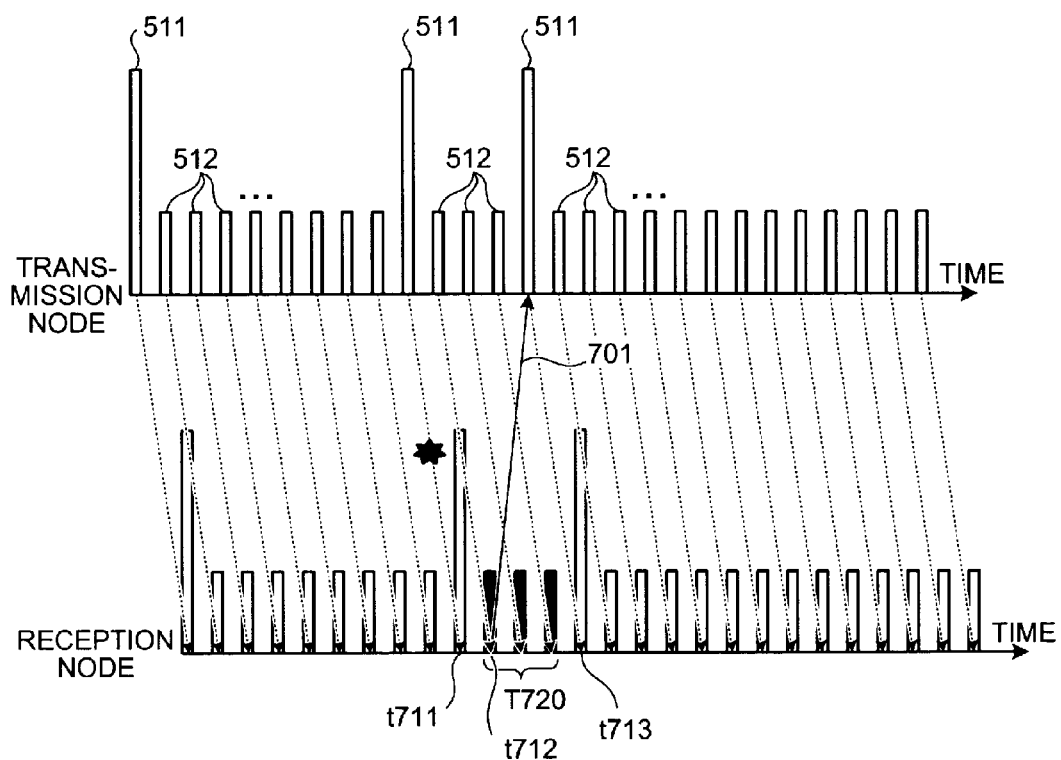
FIG. 7 is a diagram of O-mode operation of ROHC.

FIG. 7 is a diagram of the O-mode operation of ROHC. In FIG. 7, parts identical to those depicted in FIG. 5 are given the same reference numerals used in FIG. 5 and description thereof is omitted. The ROHC operation mode of the reception node 100 and the transmission node 200 is set as the O-mode (Bidirectional Optimistic Mode).

Among the frames transmitted every 20[msec], the transmission node 200 transmits, as an uncompressed frame 511, a frame whose header contents is different from that of the previous frame and transmits other frames as compressed frames 512. The reception node 100 receives the frames while expanding (recovering) the headers of the compressed frames 512, based on the context included in the previously received uncompressed frame 511.

Further, if the reception node 100 cannot properly receive the uncompressed frame 511, the reception node 100 transmits a Nack to the transmission node 200. For example, at period t711, if the reception node 100 is unable to properly receive the uncompressed frame 511, at period t712, which is immediately subsequent to period t711, the reception node 100 transmits a Nack 701 to the transmission node 200.

Upon receiving the Nack 701 from the reception node 100, the transmission node 200 retransmits the uncompressed frame 511. Here, it is assumed that the reception node 100 receives the retransmitted uncompressed frame 511 at period t713, subsequent to period t712.

Concerning the compressed frames 512 received during the interval T720, from period t711 when the uncompressed frame 511 could not be received until period t713 when the uncompressed frame 511 is received, frames have been discarded at the PDCP layer and header expansion cannot be properly performed. Consequently, the compressed frames 512 received during interval T720 result in data loss.

The interval during which the compressed frames 512 result in data loss continues until the reception node 100 subsequently receives the uncompressed frame 511 and the context is recovered. Consequently, the interval during which the compressed frames 512 result in data loss is dependent on the period from time that the reception node 100 transmits a Nack to the transmission node 200 until the transmission node 200 retransmits the uncompressed frame 511 to the reception node 100.

In this manner, in the ROHC O-mode, feedback from the reception node 100 is performed, whereby communication quality is assured. Context (the uncompressed frame 511) is transmitted if the reception node 100 could not properly receive a frame, whereby the transmission frequency of the compressed frame 512 is high and header compression efficiency is favorable.

FIG. 8 is a diagram of R-mode operation of ROHC. In FIG. 8, parts identical to those depicted in FIG. 5 are given the same reference numerals used in FIG. 5 and description thereof is omitted. In this example, the ROHC operation mode of the reception node 100 and the transmission node 200 is set as the R-mode (Bidirectional Reliable Mode).

The transmission node 200 transmits an uncompressed frame 511 every 20[msec] and upon receiving, from the reception node 100, an Ack for the uncompressed frame 511, the transmission node 200 subsequently transmits compressed frames 512 until there is a change in the header contents.

If the reception node 100 properly receives the uncompressed frames 511, the reception node 100 transmits an Ack to the transmission node 200. For example, it is assumed that at period t811, the reception node 100 properly receives the uncompressed frame 511 and transmits an Ack 801 to the transmission node 200. Upon receiving the Ack 801 from the reception node 100, the transmission node 200 transmits compressed frames 512 until there is a change in the header contents.

Further, it is assumed that at t812 subsequent to period t811, the reception node 100 cannot properly receive the uncompressed frame 511. At period t813 subsequent to period t812, it is assumed that the reception node 100 properly receives the uncompressed frame 511 and transmits an Ack 802 to the transmission node 200. Until receiving the Ack 802 from the reception node 100, the transmission node 200 transmits the uncompressed frame 511 and upon receiving the Ack 802 from the reception node 100, the transmission node 200 subsequently transmits compressed frames 512 until there is a change in the header contents.

In this manner, in the ROHC R-mode, upon receiving an Ack indicating that the context has properly reached the reception node 100, the transmission node 200 begins compressing the headers. Consequently, as compared to the U-mode and the O-mode, header compression efficiency is lower for the ROHC R-mode, but the reliability of context consistency is favorable. Furthermore, periods of data loss accompanying the inability to expand headers after context loss, do not occur.

Switching between the ROHC operations depicted in FIGS. 5 to 8 is performed by the transmission of a change instructing signal from the reception node 100 to the transmission node 200. An example of switching between the ROHC operation modes will be described hereinafter (see FIGS. 34 to 36).

FIG. 9 is a diagram of an example of a change in the voice-communication state. In FIG. 9, the horizontal axis represents time. Reference 910 represents audio data transmitted from the transmission node 200 to the reception node 100. Reference numeral 920 represents audio data transmitted from the reception node 100 to the transmission node 200.

Person A represents a user on the transmission node 200 side. Person B represents a user on the reception node 100 side.

AMR data 911 is transmitted when audio is to be transmitted. SID data 912 is transmitted when there is no audio to be transmitted. A dimension along a direction perpendicular to the horizontal axis of the AMR data 911 and the SID data 912 (the vertical direction in the figure) indicates data size. As depicted in FIG. 9, the size of the SID data 912 is smaller than that of the AMR data 911.

Intervals 931-934 are temporally continuous intervals of time. The voice-communication state of the audio data (reference numeral 910) transmitted from the transmission node 200 to the reception node 100 is "sound" in the intervals 931 and 933; and is "silence" in the intervals 932 and 934.

On the other hand, the voice-communication state of the audio data (reference numeral 920) transmitted from the reception node 100 to the transmission node 200 is "silence" in the intervals 931 and 933; and is "sound" in the intervals 932 and 934.

With the exception of, for example, arguments, in typical conversations, person A and person B alternately speak. Consequently, in the audio data (reference numeral 910) transmitted from the transmission node 200 to the reception node 100 and in the audio data (reference numeral 920) transmitted from the reception node 100 to the transmission node 200, there are intervals during which the voice-communication state is "sound" and intervals during which the voice-communication state is "silence".

In an interval when the voice-communication state is "sound", if the AMR data 911 is discarded in PDCP due to an inability to expand the headers, there is a connection to sound quality degradation. On the other hand, in an interval when the voice-communication state is "silence", since the SID data 912 is not data representing sounds by the user, even if the SID data 912 is discarded in PDCP, the call is not affected.

Using this concept, the reception node 100 and the transmission node 200 determine the voice-communication state of the audio data and change the ROHC operation state according to the determined voice-communication state. Consequently, when the voice-communication state is "sound", the quality can be improved and when the voice-communication state is "silence", efficient header compression can be facilitated.

Figure 10:
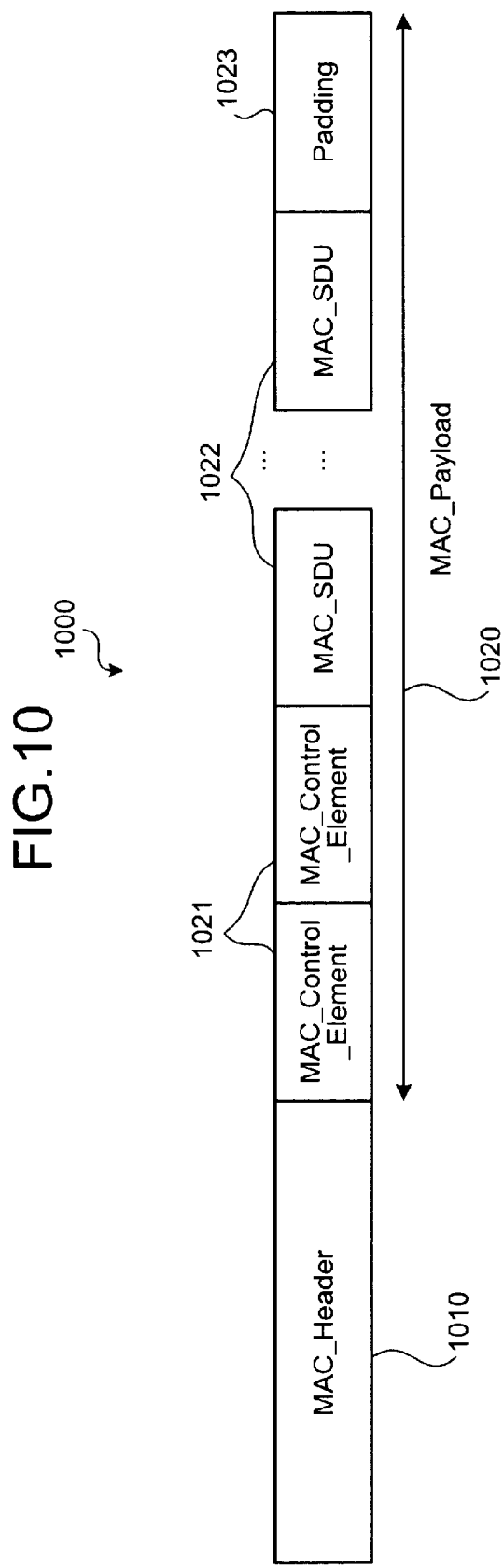
FIG. 10 is a diagram of an example of MAC_PDU.

FIG. 10 is a diagram of an example of MAC_PDU. The MAC layer frame format of the audio data transmitted and received between the reception node 100 and the transmission node 200 is, for example, a MAC_PDU 1000 depicted in FIG. 10. The MAC_PDU 1000 is a MAC frame format at a layer below PDCP in the LTE system.

The MAC_PDU 1000 includes a MAC_Header 1010 and a MAC_Payload 102. The MAC_Payload 1020 includes a MAC_Control_Element 1021 (see FIG. 11), a MAC_SDU 1022, and padding 1023.

Figure 11:
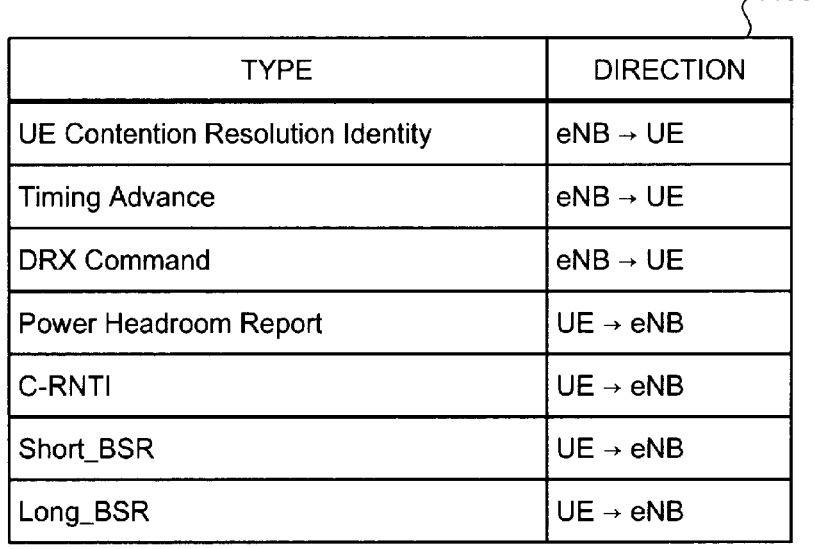
FIG. 11 is a diagram of MAC_Control_Elements depicted in FIG. 10.

FIG. 11 is a diagram of the MAC_Control_Elements depicted in FIG. 10. A table 1100 depicted in FIG. 11 depicts the types of the MAC_Control_Elements 1021 depicted in FIG. 10.

For audio data that is transmitted from the transmission node 200 to the reception node 100 (eNB→UE), the MAC_Control_Element 1021 type field includes "UE Contention Resolution Identity", "Timing Advance", and "DRX Command".

Further, for audio data that is transmitted from the reception node 100 to the transmission node 200 (UE→eNB), the MAC_Control_Element 1021 type field includes "Power Headroom Report", "C-RNTI", "Short_BSR", and "Long_BSR".

"Short_BSR" and "Long_BSR" indicates the volume of accumulated data in the buffer. Therefore, by the "Short_BSR" or the "Long_BSR" included in the MAC_Control_Element 1021, the transmission node 200 can notify the reception node 100 of the volume of accumulated data in the transmission buffer 211.

Figure 12:
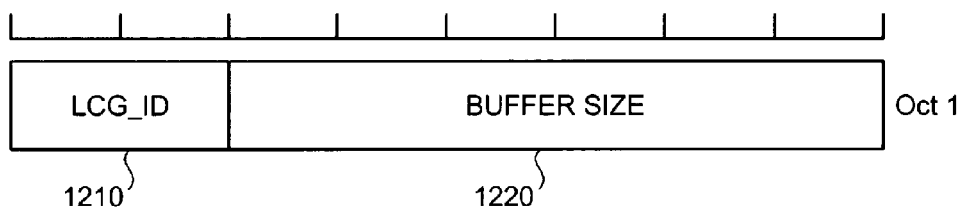
FIG. 12 is a diagram of a Short_BSR depicted in FIG. 11.

FIG. 12 is a diagram of the Short_BSR depicted in FIG. 11. The frame format of the "Short_BSR" depicted in FIG. 11 is, for example, a Short_BSR 1200 depicted in FIG. 12. The Short_BSR 1200 includes an LCG_ID 1210 (Logical Channel Group) and buffer size 1220.

The LCG_ID 1210 is an ID of a logical channel group (e.g., logical channel groups #1-#4). The buffer size 1220 indicates the total volume of accumulated data for the logical channel group of the LCG_ID 1210. An example of the buffer size 1220 will be described hereinafter (see FIG. 14).

Figure 13:
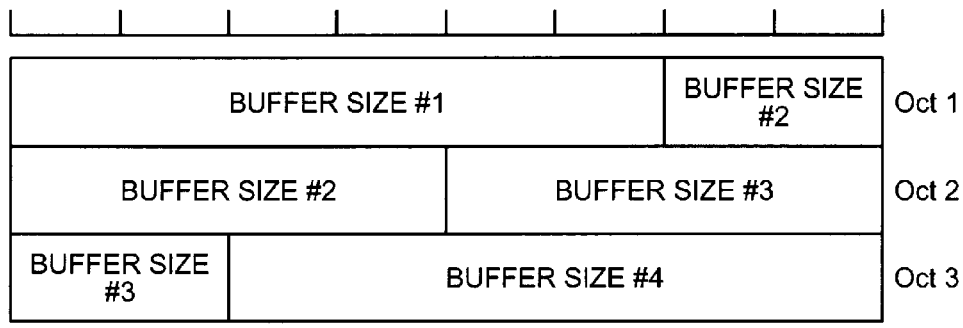
FIG. 13 is a diagram of a Long_BSR depicted in FIG. 11.

FIG. 13 is a diagram of the Long_BSR depicted in FIG. 11. The frame format of the "Long_BSR" depicted in FIG. 11 is, for example, a Long_BSR 1300 depicted in FIG. 13. The Long_BSR 1300 includes buffer sizes #1-#4. The buffer sizes #1-#4 indicate the total volume of accumulated data for each UE. An example of the buffer sizes #1-#4 will be described hereinafter (see FIG. 14).

FIG. 14 is a diagram of a buffer size index. The buffer size 1220 depicted in FIG. 12 or the buffer sizes #1-#4 depicted in FIG. 13, for example, are indicated by an index based on a table 1400 depicted in FIG. 14. For example, a buffer size (BS) of 0[Bytes] is indicated by an index "0".

A buffer size that is greater than 0[Bytes] and equal to or less than 10[Bytes] is indicated by an index "1". Further, a buffer size that is greater than 10[Bytes] and equal to or less than 12[Bytes] is indicated by an index "2". In this manner, by indicating buffer size, which indicates data-volume information by an index, the size of the data-volume information can be made small.

FIG. 15 is a diagram of a data PDU format. The PDCP header frame format of the data PDU transmitted and received between the reception node 100 and the transmission node 200 is, for example, a PDCP frame 1500 depicted in FIG. 15. The PDCP frame 1500 includes D/C 1510, R 1520 (Reserved), a PDCP sequence number 1530, and data 1540.

The D/C 1510 is a value indicting whether the PDCP frame 1500 is a data PDU or a control PDU. In the PDCP frame 1500, the D/C 1510 is "1" indicative of data PDU. The R 1520 is not used in herein. The PDCP sequence number 1530 is the PDCP frame 1500 sequence number. The data 1540 is, for example, the AMR data 911 or the SID data 912.

FIG. 16 is a diagram of an example of control PDU format. In FIG. 16, parts identical to those depicted in FIG. 15 are given the same reference numerals used in FIG. 15 and description thereof is omitted. The PDCP header of control PDU transmitted and received between the reception node 100 and the transmission node 200 are, for example, a PDCP frame 1600 depicted in FIG. 16.

The PDCP frame 1600 includes D/C 1510, PDU type 1610, R 1520, and an Interspersed ROHC feedback packet 1620. In the PDCP frame 1600, the D/C 1510 is "0" indicative of control PDU. The PDU type 1610 indicates the type of control PDU (PDCP status report, header compression feedback information, etc.).

FIG. 17 is a flowchart of an example of operation of the reception node depicted in FIG. 1. The reception node 100 depicted in FIG. 1 performs the steps depicted in FIG. 17. The voice-communication state determining unit 134 of the reception node 100 determines the voice-communication state ("sound" or "silence") of the audio data that the reception node 100 received from the transmission node 200 (step S1701).

The voice-communication state determining unit 134 determines whether the voice-communication state determined at step S1701 has changed from the voice-communication state that was previously determined by the voice-communication state determining unit 134 (step S1702). If the voice-communication state has not changed (step S1702: NO), the reception node 100 returns to step S1701 and continues processing therefrom.

At step S1702, if the voice-communication state has changed (step S1702: YES), the ROHC control unit 135 changes the ROHC operation mode according to the voice-communication state determined at step S1701 (step S1703), ending a series of operations. If the voice-communication state is "silence", at step S1703, the ROHC control unit 135 changes the ROHC operation mode to, for example, the U-mode which has high header compression frequency.

If voice-communication state is "sound", at step S1703, the ROHC control unit 135 changes the ROHC operation mode to, for example, the O-mode or the R-mode, which have low header compression frequencies. Consequently, when the voice-communication state is "sound", sound quality can be improved and when the voice-communication state is "silence" efficient header compression can be facilitated.

FIG. 18 is a flowchart of step S1701 depicted in FIG. 17. At step S1701 depicted in FIG. 17, the voice-communication state determining unit 134, for example, executes the following steps. The voice-communication state determining unit 134 determines whether the time that has elapsed since the start of operation has become at least equal to a monitoring cycle (e.g., 20[msec]) (step S1801), and waits until the elapsed time is equal to or greater than the monitoring cycle (step S1801: NO).

At step S1801, when the elapsed time has become equal to or greater than the monitoring cycle (step S1801: YES), the voice-communication state determining unit 134 measures the volume of accumulated data in the reception buffer 131 (step S1802) and determines whether the voice-communication state previously determined by the voice-communication state determining unit 134 and stored in memory is "sound" (step S1803).

At step S1803, if the voice-communication state is "sound" (step S1803: YES), the voice-communication state determining unit 134 determines whether the volume of accumulated data measured at step S1802 is at most a threshold (step S1804). If the volume of accumulated data is not less than or equal to the threshold (step S1804: NO), the series of processes ends.

At step S1804, if the volume of accumulated data measured at step S1802 is less than or equal to the threshold (step S1804: YES), the voice-communication state stored in the memory is updated to "silence" (step S1805), ending the series of the processes.

At step S1803, if the voice-communication state is not "sound" (step S1803: NO), the voice-communication state determining unit 134 determines whether the volume of accumulated data measured at step S1802 is greater than a threshold (step S1806). If the volume of accumulated data is not greater than the threshold (step S1806: NO), the series of processes ends.

At step S1806, if the volume of accumulated data measured at step S1802 is greater than the threshold (step S1806: YES), the voice-communication state stored in the memory is updated to "sound" (step S1807), ending the series of processes. At step S1804 and step S1806, the thresholds used for comparison, for example, correspond to the size of the SID data 912 depicted in FIG. 9.

Figure 19:
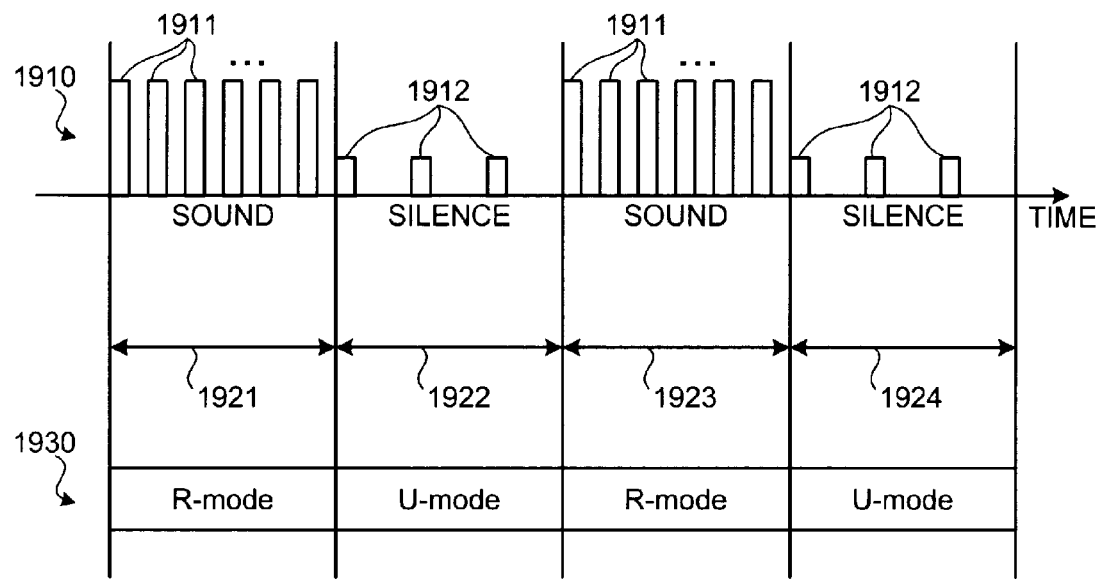
FIG. 19 is a diagram of an example of changing the ROHC operation mode.

FIG. 19 is a diagram of an example of changing the ROHC operation mode. In FIG. 19, the horizontal axis represents time. Reference numeral 1910 represents audio data transmitted from the transmission node 200 to the reception node 100. AMR data 1911 is transmitted when audio (sound) is to be transmitted. SID data 1912 is transmitted when there is no audio to be transmitted (silence).

Intervals 1921-1924 are temporally continuous intervals of time. The voice-communication state in the intervals 1921 and 1923 is "sound" and AMR data 1911 is transmitted. The voice-communication state in the intervals 1922 and 1924 is "silence" and SID data 1912 is transmitted.

Reference numeral 1930 indicates the ROHC operations modes switched to by the reception node 100. As indicated by reference numeral 1930, the reception node 100 determines that the voice-communication state is "sound" in the intervals 1921 and 1923 and the reception node 100 changes the ROHC operation mode to the R-mode (or the O-mode, for example) in intervals 1921 and 1923. The reception node 100 determines that the voice-communication state is "silence" in the intervals 1922 and 1924 and the reception node 100 changes the ROHC operation mode to the U-mode in the intervals 1922 and 1924.

Consequently, in the intervals 1922 and 1924 in which the voice-communication state is "silence", the ROHC operation mode is set to the U-mode, which has high header compression frequency. As a result, the wireless band utilization efficiency can be improved. On the other hand, in the intervals 1921 and 1923 in which the voice-communication state is "sound", the ROHC operation mode is set to the R-mode, which has low header compression frequency. As a result, sound quality can be improved.

In this manner, according to the reception node 100 (receiving apparatus) of the first embodiment, the voice-communication state is determined and according to the determined voice-communication state, the ROHC operation mode can be changed. Consequently, when the voice-communication state is "sound", sound quality can be improved and when the voice-communication state is "silence", efficient header compression can be facilitated. Therefore, the quality of audio data and band utilization efficiency can be improved.

Further, the volume of accumulated data in the reception buffer 131 is measured and based on the measured volume of accumulated data, the voice-communication state can be determined. For example, by comparing the measured volume of accumulated data and a threshold, the voice-communication state ("sound" or "silence") can be easily determined.

In a second embodiment, in the LTE system, the transmission node 200 uses the BSR that is transmitted to the reception node 100 to determine the voice-communication state. As described above, BSR (see FIGS. 11-13), which indicates the volume of data accumulated in the transmission buffer 211 of the transmission node 200, is included in the MAC_Control_Element of the MAC_PDU (see FIG. 10) that the transmission node 200 transmits to the reception node 100.

Figure 20:
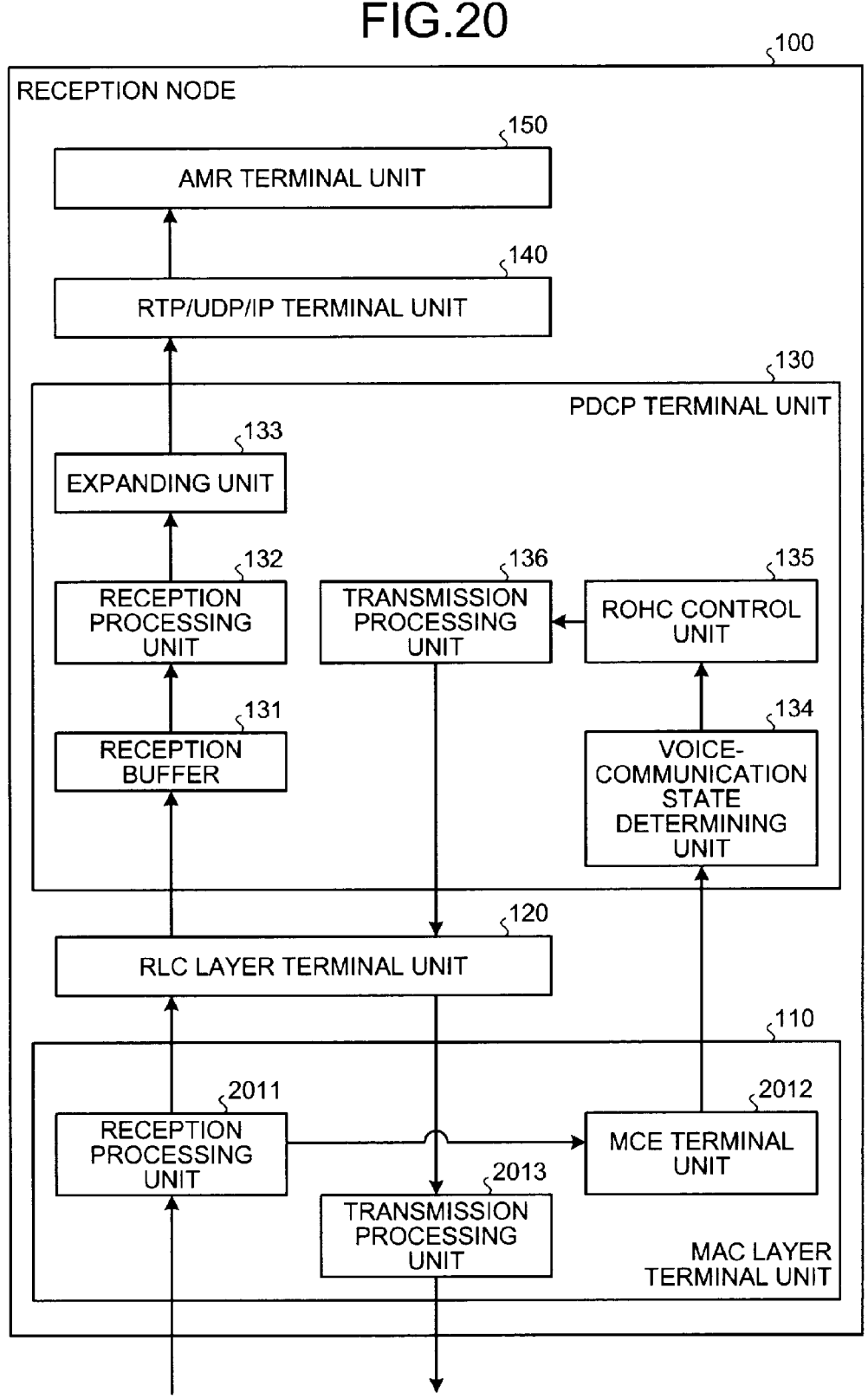
FIG. 20 is a block diagram of an example of configuration of the reception node according to a second embodiment.

FIG. 20 is a block diagram of an example of configuration of the reception node according to the second embodiment. In FIG. 20, parts identical to those depicted in FIG. 1 are given the same reference numerals used in FIG. 1 and description thereof is omitted. As depicted in FIG. 20, the MAC layer terminal unit 110 of the reception node 100 according to the second embodiment includes a reception processing unit

2011, an MCE terminal unit 2012, and a transmission processing unit 2013. The reception processing unit 2011 performs reception processing in the MAC layer.

The reception processing unit 2011 outputs reception processed data to the RLC layer terminal unit 120 and the MCE terminal unit 2012. The MCE terminal unit 2012 is a terminus of the MCE (MAC_Control_Element). For example, the MCE terminal unit 2012 acquires the BSR (see FIGS. 11-13) included in data output from the reception processing unit 2011.

BSR indicates the volume of accumulated data in the transmission buffer 211 of the transmission node 200. The MCE terminal unit 2012 outputs the acquired BSR, as the accumulated data volume, to the PDCP terminal unit 130. The transmission processing unit 2013 performs transmission processing in the MAC layer. The transmission processing unit 2013 transmits transmission processed data to the transmission node 200.

The voice-communication state determining unit 134 of the PDCP terminal unit 130 determines the voice-communication state, based on the accumulated data volume indicated by the BSR output from the MCE terminal unit 2012. For example, if the accumulated data volume output is greater than a threshold, the voice-communication state determining unit 134 determines that the voice-communication state is "sound". If the accumulated data volume is less than or equal to the threshold, the voice-communication state determining unit 134 determines that the voice-communication state is "silence".

Figure 21:
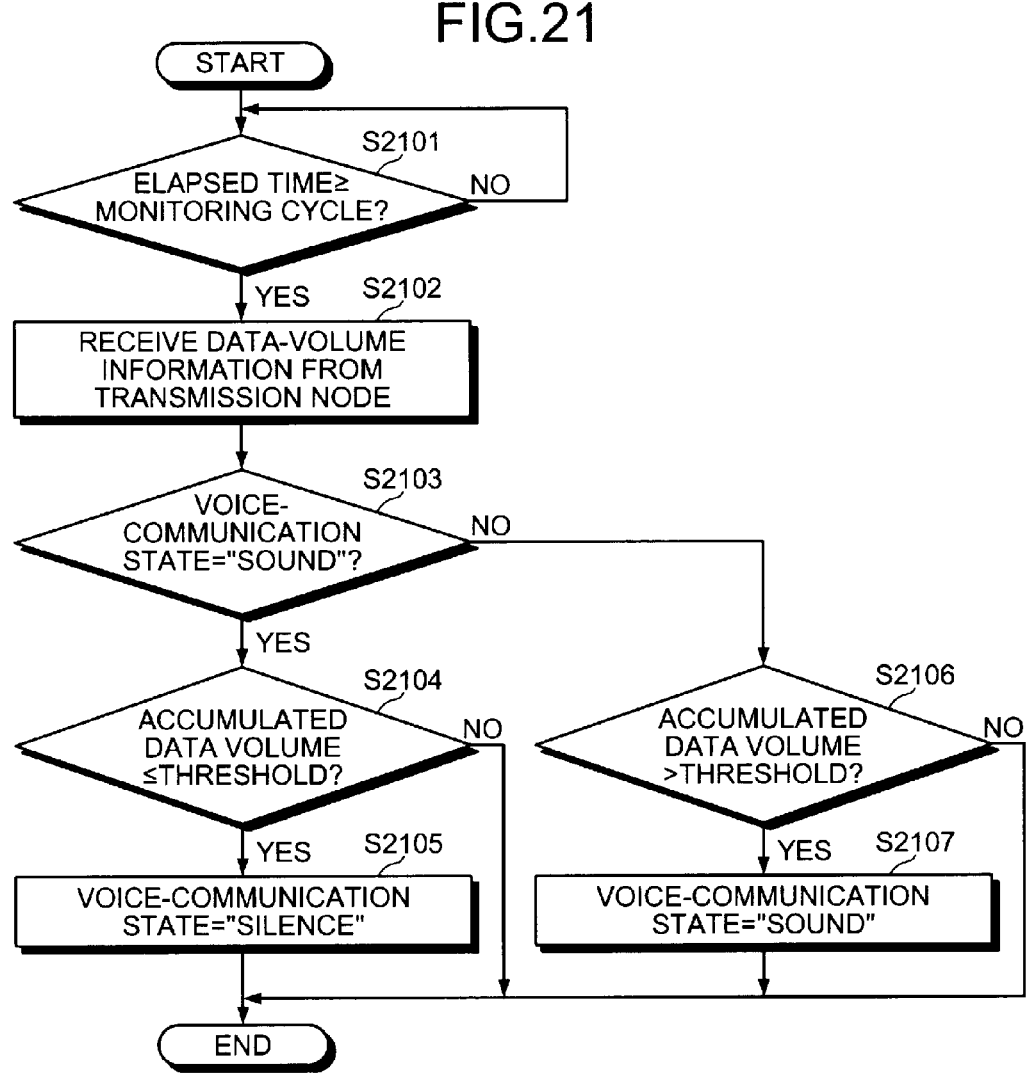
FIG. 21 is a flowchart of an example of operation of the transmission node according to the second embodiment.

FIG. 21 is a flowchart of an example of operation of the transmission node according to the second embodiment. Fundamental operations of the reception node 100 depicted in FIG. 20 are identical to those depicted in FIG. 17. Furthermore, the voice-communication state determining unit 134 of the reception node 100 depicted in FIG. 20 performs the following steps at step S1701 depicted in FIG. 17.

The voice-communication state determining unit 134 determines whether the time that has elapsed since the start of the operation has become at least equal to a monitoring cycle (step S2101), and waits until the elapsed time is equal to or greater than the monitoring cycle (step S2101: NO). When the elapsed time has become equal to or greater than the monitoring cycle (step S2101: YES), the voice-communication state determining unit 134 receives, through the MCE terminal unit 2012, the data-volume information (BSR) transmitted from the transmission node 200 (step S2102). The data-volume information received at step S2102 indicates the volume of accumulated data in the transmission buffer 211 of the transmission node 200.

The voice-communication state determining unit 134 determines whether the voice-communication state stored in memory at the previous determination of the voice-communication state, is "sound" (step S2103). If the voice-communication state is "sound" (step S2103: YES), the voice-communication state determining unit 134 determines whether the accumulated data volume indicated by the data-volume information received at step S2102 is at most a threshold (step S2104). If the accumulated data volume is not equal to or less than the threshold (step S2104: NO), the series of operations ends.

If the accumulated data volume indicated by the data-volume information received is less than or equal to the threshold, at step S2104 (step S2104: YES), the voice-communication state determining unit 134 updates the voice-communication state stored in the memory, to "silence" (step S2105), ending the series of operations.

At step S2103, if the voice-communication state is not "sound" (step S2103: NO), the voice-communication state determining unit 134 determines whether the accumulated data volume indicated by the data-volume information received at step S2102, is greater than the threshold (step S2106). If the accumulated data volume is not greater than the threshold (step S2106: NO), the series of operations ends.

At step S2106, if the accumulated data volume indicated by the received data-volume information is greater than the threshold (step S2106: YES), the voice-communication state determining unit 134 updates the voice-communication state stored in the memory to "sound" (step S2107), ending the series of operations. As depicted in FIG. 14, if the BSR buffer size is indexed, at step S2104 and step S2106, the threshold used for comparison also uses the index depicted in FIG. 14.

In this manner, according to the reception node 100 (receiving apparatus) of the second embodiment, the voice-communication state is determined and according to the determined voice-communication state, the ROHC operation mode can be changed. Consequently, when the voice-communication state is "sound", sound quality can be improved and when the voice-communication state is "silence", efficient header compression can be facilitated. As a result, the sound quality of audio data and band utilization efficiency can be improved.

In the transmission node 200, the volume of accumulated data in the transmission buffer 211 is measured and data-volume information indicating the measured volume of accumulated data is transmitted to the reception node 100. Consequently, the reception node 100 can determine the voice-communication state, based on the data-volume information received from the transmission node 200. Use of the accumulated data volume on the transmission node 200 side enables accurate determination of the voice-communication state, irrespective of the wireless interval quality, etc.

The transmission node 200 uses the BSR included in the MAC_Control_Element of the MAC_PDU (see FIG. 10) transmitted to the reception node 100 and transmits data-volume information, whereby the data-volume information can be transmitted to the reception node 100 without newly adding a control signal that is to be transmitted from the transmission node 200 to the reception node 100.

Figure 22:
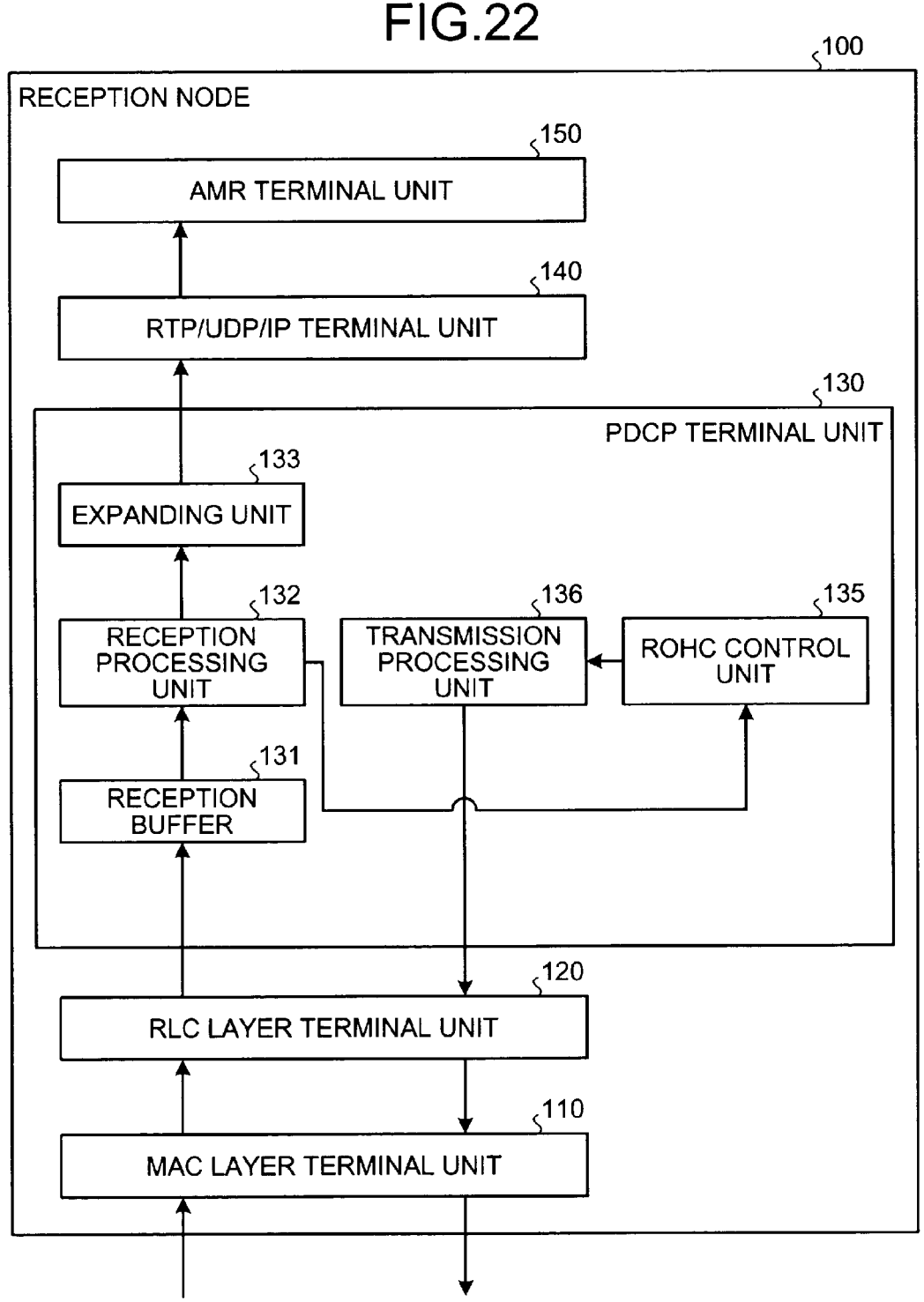
FIG. 22 is a block diagram of an example of configuration of the reception node according to a third embodiment.

FIG. 22 is a block diagram of an example of configuration of the reception node according to a third embodiment. In FIG. 22, parts identical to those depicted in FIG. 1 are given the same reference numerals used in FIG. 1 and description thereof is omitted. In the reception node 100 according to the third embodiment, the voice-communication state determining unit 134 depicted in FIG. 1 may be omitted.

Among the data readout from the reception buffer 131, the reception processing unit 132 outputs to the ROHC control unit 135, voice-communication state information that is transmitted from the transmission node 200. According to the voice-communication state determination results ("sound" or "silence") indicated by the voice-communication state information output from the reception processing unit 132, the ROHC control unit 135 changes the ROHC operation mode.

Figure 23:
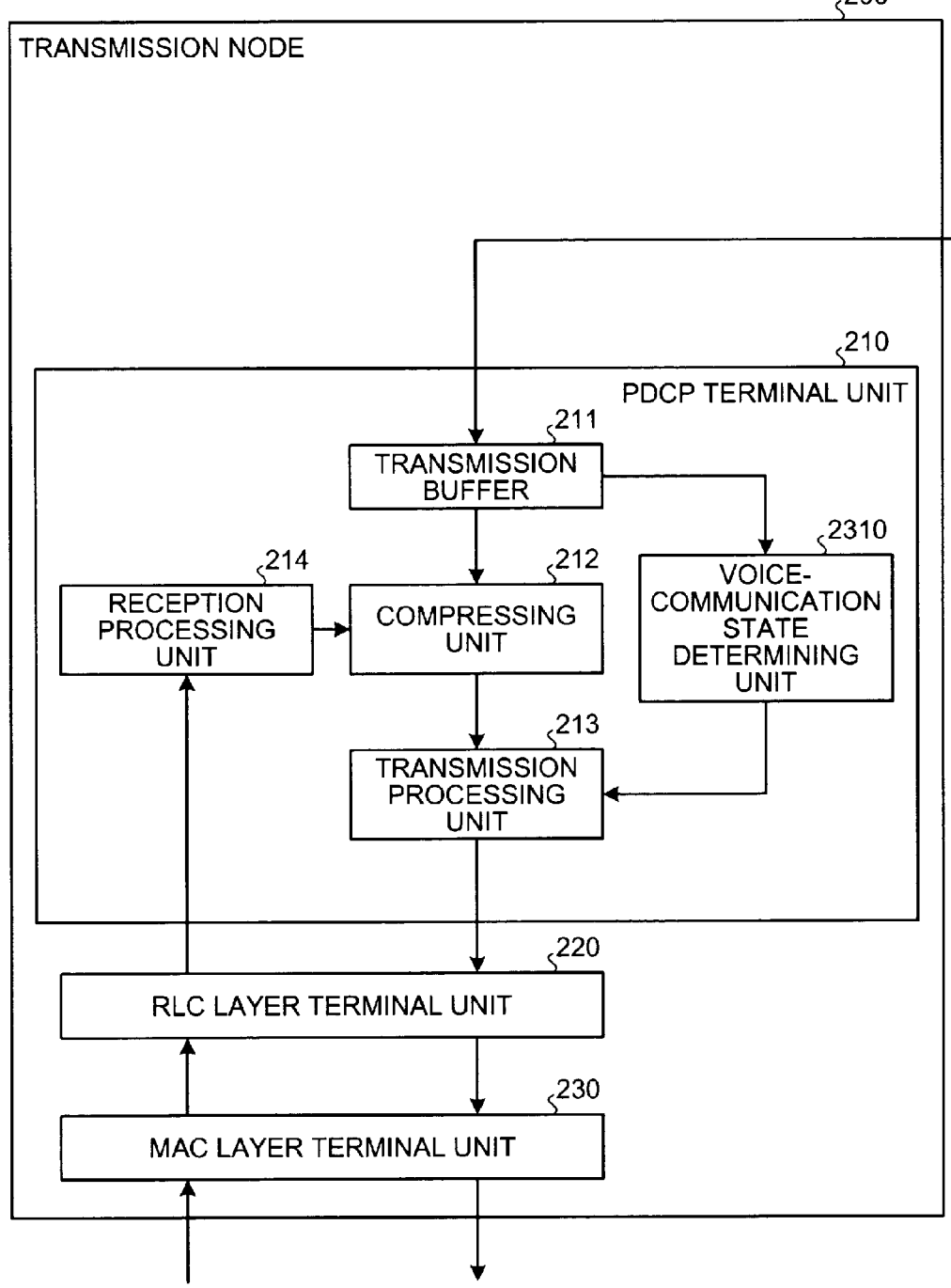
FIG. 23 is a block diagram of an example of configuration of the transmission node according to the third embodiment.

FIG. 23 is a block diagram of an example of configuration of the transmission node according to the third embodiment. In FIG. 23, parts identical to those depicted in FIG. 2 are given the same reference numerals used in FIG. 2 and description thereof is omitted. As depicted in FIG. 23, the PDCP terminal unit 210 of the transmission node 200 according to the third embodiment includes a voice-communication state determining unit 2310 in addition to the configuration depicted in FIG. 2.

The voice-communication state determining unit 2310 determines the voice-communication state of audio data transmitted from the transmission node 200 to the reception node 100 and outputs to the transmission processing unit 213, voice-communication state information indicating the determination results. The voice-communication state determined by the voice-communication state determining unit 2310 is, for example, a state related to whether the audio of the audio data is "sound" or "silence". The voice-communication state determining unit 2310, for example, determines the voice-communication state, based on the volume of accumulated data in the transmission buffer 211.

For example, if volume of accumulated data in the transmission buffer 211 is greater than a threshold, the voice-communication state determining unit 2310 determines that the voice-communication state is "sound" and if the volume of accumulated data in the transmission buffer 211 less than or equal to the threshold, the voice-communication state determining unit 2310 determines that the voice-communication state is "silence". The threshold compared with the volume of accumulated data is, for example, the voice-communication state "silence" and a value that corresponds to the volume of SID data accumulated in the transmission buffer 211 when the transmission node 200 transmits SID data.

The transmission processing unit 213 outputs, through the RLC layer terminal unit 220 and the MAC layer terminal unit 230, to the reception node 100, the voice-communication state information output from the voice-communication state determining unit 2310, enabling the voice-communication state information to be transmitted to the reception node 10. A PDCP frame for transmitting the voice-communication state information is described with reference to FIG. 24.

Figure 24:
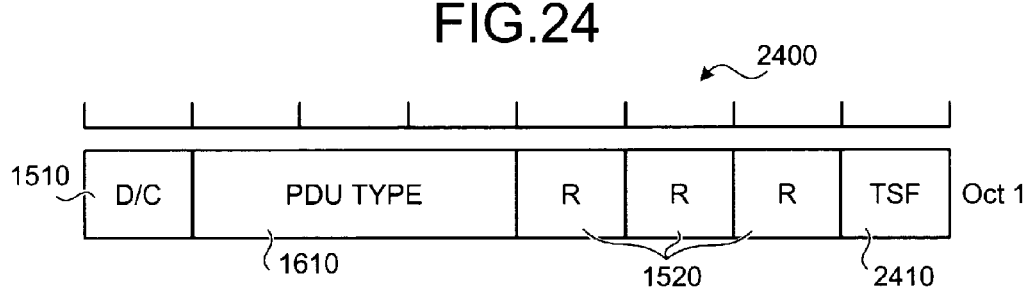
FIG. 24 is a diagram of an example of PDCP frame format.

FIG. 24 is a diagram of an example of PDCP frame format. In FIG. 24, parts identical to those depicted in FIG. 16 are given the same reference numerals used in FIG. 16 and description thereof is omitted. The PDCP header frame format of the control PDU that the transmission processing unit 213 transmits to the reception node 100, for example, is that of a PDCP frame 2400 depicted in FIG. 24.

The PDCP frame 2400 includes the D/C 1510, the PDU type 1610, the R 1520, and a telephone call status flag (TSF) 2410. In the PDCP frame 2400, the D/C 1510 is "0" indicating a control PDU.

The TSF 2410 indicates the voice-communication state of audio data transmitted from the transmission node 200 to the reception node 100. The transmission processing unit 213 stores to the TSF 2410 of the PDCP frame 2400, the voice-communication state information output from the voice-communication state determining unit 2310. The reception processing unit 132 of the reception node 100 outputs to the ROHC control unit 135 and as the voice-communication state information, the TSF 2410 of the PDCP frame 2400 received from the transmission node 200.

Figure 25:
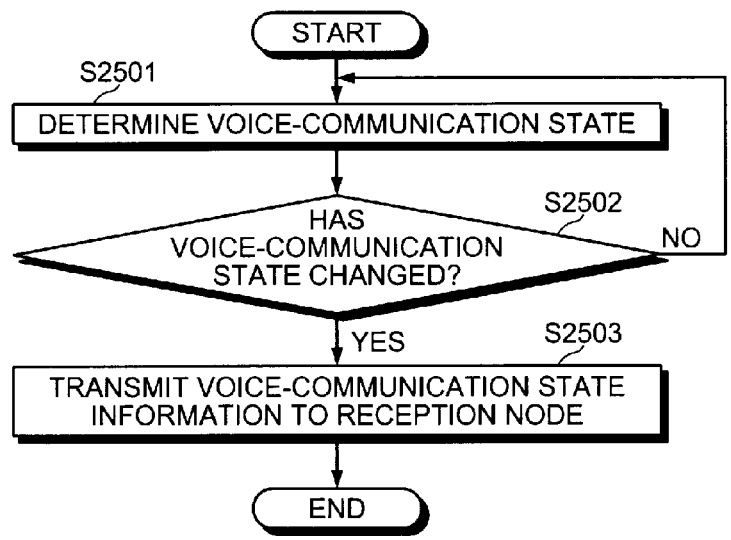
FIG. 25 is a flowchart of an example of operation of the transmission node depicted in FIG. 23.

FIG. 25 is a flowchart of an example of operation of the transmission node depicted in FIG. 23. The transmission node 200 depicted in FIG. 23 performs the steps depicted in FIG. 25. The voice-communication state determining unit 2310 of the transmission node 200 determines the voice-communication state of audio data transmitted from the transmission node 200 to the reception node 100 (step S2501).

The voice-communication state determining unit 2310 determines whether the voice-communication state determined at step S2501 has changed from the voice-communication state that was previously determined by the voice-communication state determining unit 2310 (step S2502). If the voice-communication state has not changed (step S2502: NO), the transmission node 200 returns to step S2501 and continues processing therefrom.

At step S2502, if voice-communication state has changed (step S2502: YES), the transmission processing unit 213 transmits to the reception node 100, voice-communication state information that indicates the voice-communication state determined at step S2501 (step S2503), ending the series of operations. The voice-communication state information transmitted at step S2503 is received by the reception node 100. According to the voice-communication state indicated by the received voice-communication state information, the reception node 100 changes the ROHC operation mode for communication with the transmission node 200.

Figure 26:
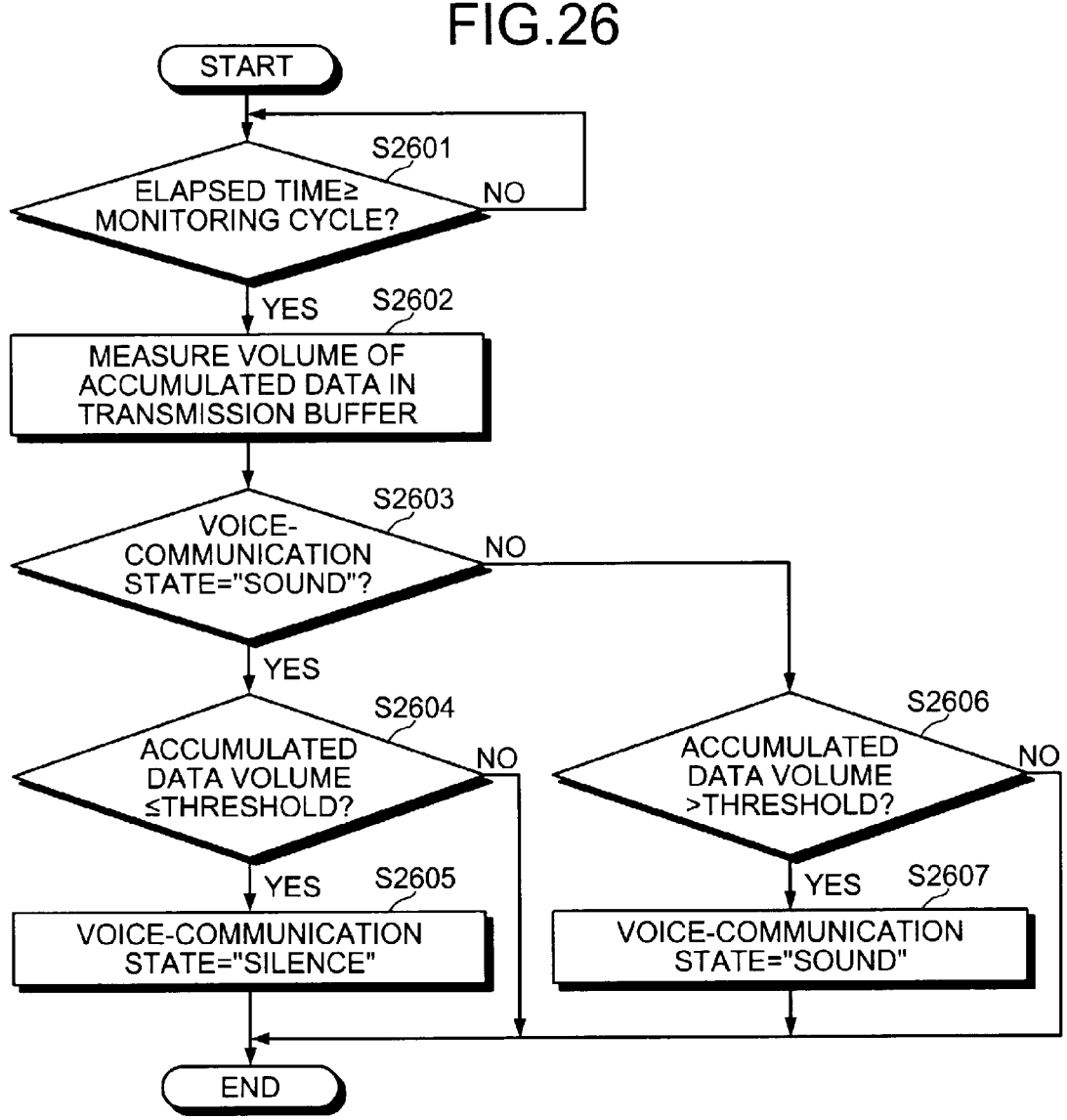
FIG. 26 is a flowchart of step S2501 depicted in FIG. 25.

FIG. 26 is a flowchart of step S2501 depicted in FIG. 25. At step S2501, the voice-communication state determining unit 2310, for example, executes the following steps. The voice-communication state determining unit 2310 determines whether the time that has elapsed since the start of operation has become at least equal to a monitoring cycle (step S2601), and waits until the elapsed time is equal to or greater than the monitoring cycle (step S2601: NO).

At step S2601, when the elapsed time has become equal to or greater than the monitoring cycle (step S2601: YES), the voice-communication state determining unit 2310 measures the volume of accumulated data in the transmission buffer 211 (step S2602). Steps S2603-S2607 depicted in FIG. 26 are identical to steps S1803-S1807 depicted in FIG. 18 and description thereof is omitted.

In this manner, according to the reception node 100 (receiving apparatus) of the third embodiment, the voice-communication state is determined and according to the determined voice-communication state, the ROHC operation mode can be changed. Consequently, when the voice-communication state is "sound", sound quality can be improved and when the voice-communication state is "silence", efficient header compression can be facilitated. As a result, the sound quality of audio data and band utilization efficiency can be improved.

Further, in the transmission node 200, the voice-communication state is determined and voice-communication state information indicating the determination results is transmitted to the reception node 100, whereby the reception node 100 can change the ROHC operation mode according to the voice-communication state indicated by the voice-communication state information received from the transmission node 200. By determining the voice-communication state on the transmission node 200 side, the voice-communication state can be accurately determined, irrespective of wireless interval quality.

Further, by determining the voice-communication state on the transmission node 200 side, the processing load on the reception node 100 side can decreased. The transmission node 200 includes the TSF 2410 in the PDCP frame 2400 that is transmitted to the reception node 100, uses the TSF 2410, and transmits voice-communication state information, whereby the voice-communication state information can be transmitted to the reception node 100.

Figure 27:
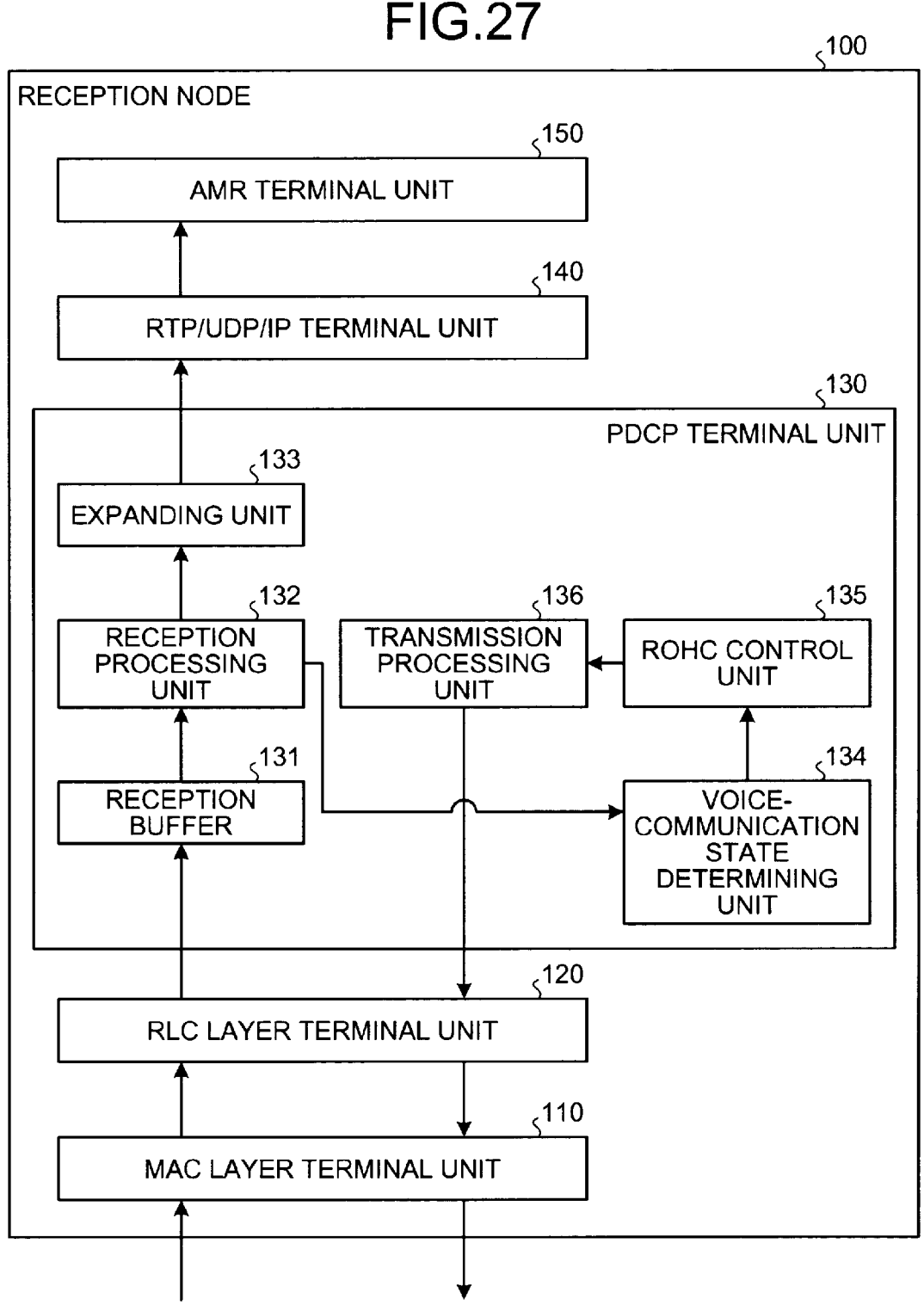
FIG. 27 is a block diagram of an example of configuration of the reception node according to a fourth embodiment.

FIG. 27 is a block diagram of an example of configuration of the reception node according to a fourth embodiment. In FIG. 27, parts identical to those depicted in FIG. 1 are given the same reference numerals used in FIG. 1 and description thereof is omitted. The reception processing unit 132 of the reception node 100 according to the fourth embodiment outputs to the voice-communication state determining unit 134, data-volume information that is among the reception processed data.

The data-volume information that is output to the voice-communication state determining unit 134 indicates the volume of accumulated data in the transmission buffer 211 in the transmission node 200. The voice-communication state determining unit 134 determines the voice-communication state, based on the data-volume information output from the reception processing unit 132. For example, if the accumulated data volume is greater than a threshold, the voice-communication state determining unit 134 determines that the voice-communication state is "sound" and if the accumulated data volume is less than or equal to the threshold, the voice-communication state determining unit 134 determines that voice-communication state is "silence".

Figure 28:
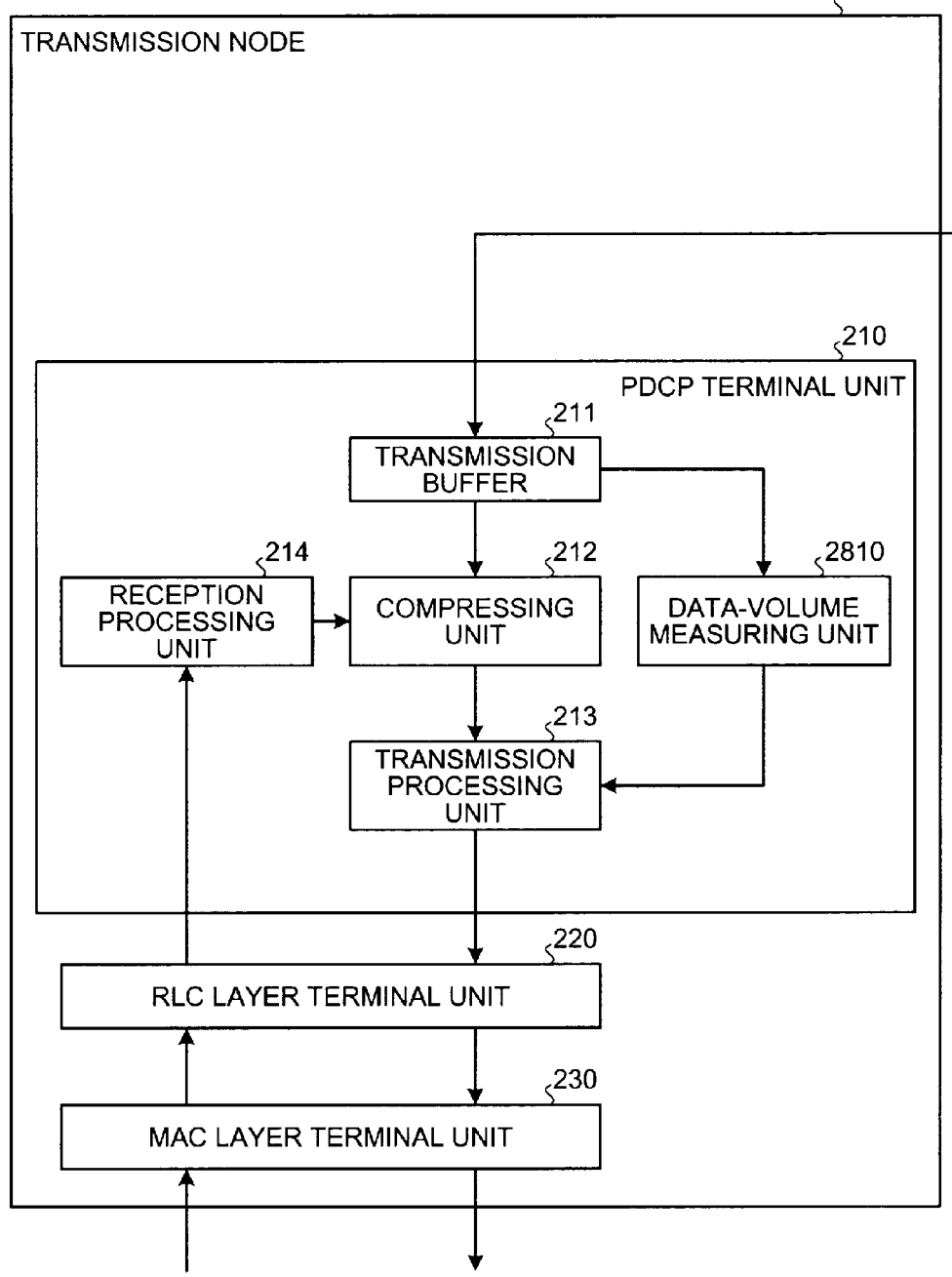
FIG. 28 is a block diagram of an example of configuration of the transmission node according to the fourth embodiment.

FIG. 28 is a block diagram of an example of configuration of the transmission node according to the fourth embodiment. In FIG. 28, parts identical to those depicted in FIG. 2 are given the same reference numerals used in FIG. 2 and description thereof is omitted. As depicted in FIG. 28, the PDCP terminal unit 210 of the transmission node 200 according to the fourth embodiment includes a data-volume measuring unit 2810 in addition to the configuration depicted in FIG. 2.

The data-volume measuring unit 2810 measures the volume of accumulated data in the transmission buffer 211 and outputs to the transmission processing unit 213, data-volume information that indicates the measured volume of accumulated data. The transmission processing unit 213 transmits to the reception node 100, through the RLC layer terminal unit 220 and the MAC layer terminal unit 230, the data-volume information output from the data-volume measuring unit 2810. Consequently, the data-volume information can be transmitted to the reception node 100. The PDCP frame for transmitting the data-volume information will be described with reference to FIG. 29.

Figure 29:
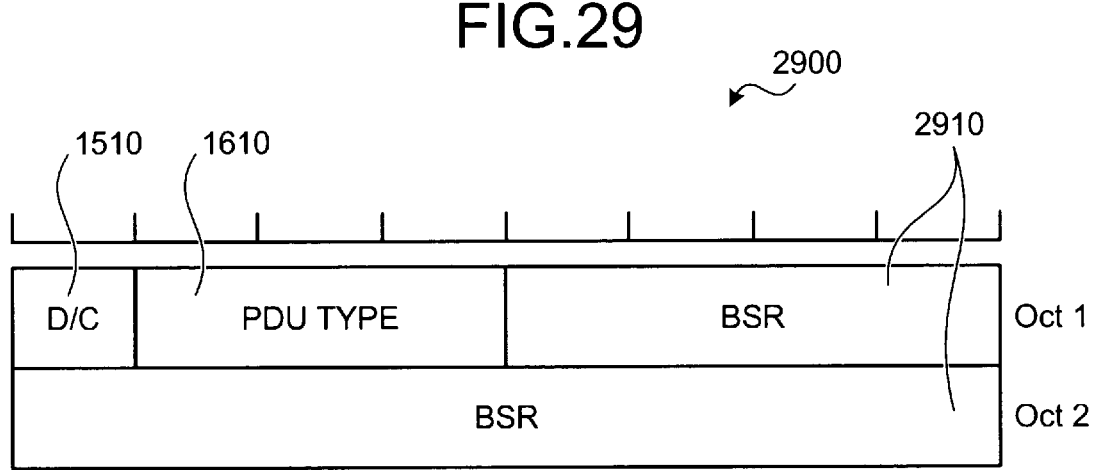
FIG. 29 is a diagram of an example of PDCP frame format.

FIG. 29 is a diagram of an example of PDCP frame format. In FIG. 29, parts identical to those depicted in FIG. 16 are given the same reference numerals used in FIG. 16 and description thereof is omitted. The PDCP header frame format of the control PDU that is transmitted by the transmission processing unit 213 of the transmission node 200 is, for example, that of a PDCP frame 2900 depicted in FIG. 29.

The PDCP frame 2900 includes the D/C 1510, the PDU type 1610, and a BSR 2910. In the PDCP frame 2900, the D/C 1510 is "0" indicating a control PDU.

The BSR 2910 indicates the volume of accumulated data in the transmission buffer 211 of the transmission node 200. The transmission processing unit 213 stores to the BSR 2910 of the PDCP frame 2900, the data-volume information output from the data-volume measuring unit 2810 and further transmits the data-volume information to the reception node 100. The reception processing unit 132 of the reception node 100 outputs to the voice-communication state determining unit 134, as the accumulated data volume, the BSR 2910 of the PDCP frame 2900 received from the transmission node 200.

In this manner, according to the reception node 100 (receiving apparatus) of the fourth embodiment, the voice-communication state is determined and according to the determined voice-communication state, the ROHC operation mode can be changed. Consequently, when the voice-communication state is "sound", the sound quality can be improved and when the voice-communication state is "silence", efficient header compression can be facilitated.

Further, in the transmission node 200, the volume of accumulated data in the transmission buffer 211 is measured and data-volume information that indicates the measured volume of accumulated data is transmitted to the reception node 100, whereby based on the accumulated data volume indicated by the data-volume information received from the transmission node 200, the reception node 100 can determine the voice-communication state. Use of the accumulated data volume on the transmission node 200 side enables the voice-communication state to be accurately determined, irrespective of wireless interval quality.

The transmission node 200 includes the BSR 2910 in the PDCP frame 2900 transmitted to the reception node 100, uses the BSR 2910, and transmits the data-volume information, whereby the accumulated data volume can be reported to the reception node 100 by the transmission node 200.

The voice-communication state determining unit 134 of the reception node 100 according to a fifth embodiment determines that the voice-communication state is "sound", if the volume of accumulated data in the reception buffer 131 is greater than a threshold for a given period or longer. If the volume of accumulated data in the reception buffer 131 is less than or equal to the threshold for the given period or longer, the voice-communication state determining unit 134 determines that the voice-communication state is "silence". The configurations of the reception node 100 and the transmission node 200 are, for example, identical to the configurations depicted in FIG. 1 and FIG. 2.

Figure 30:
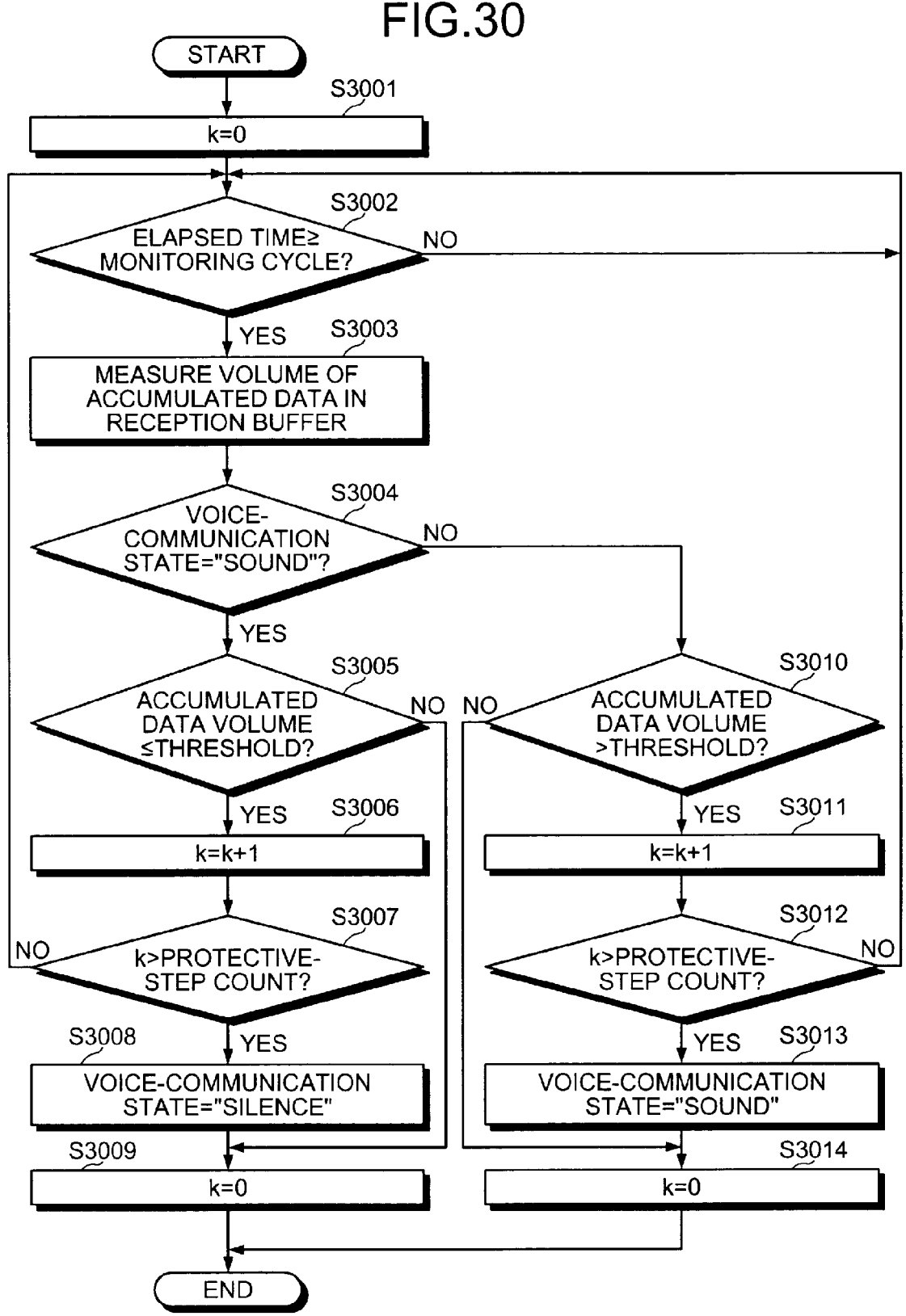
FIG. 30 is a flowchart of an example of operation of the reception node according to a fifth embodiment.

FIG. 30 is a flowchart of an example of operation of the reception node according to the fifth embodiment. Fundamental operations of the reception node 100 according to the fifth embodiment are identical to those depicted in FIG. 17. Furthermore, the voice-communication state determining unit 134 of the reception node 100 according to the fifth embodiment performs the following steps at step S1701 depicted in FIG. 17.

The voice-communication state determining unit 134 sets a counter k to 0 (step S3001), determines whether the time that has elapsed since the start of operation is at least equal to a monitoring cycle (step S3002), and waits until the elapsed time is equal to or greater than the monitoring cycle (step S3002: NO).

At step S3002, when the elapsed time becomes equal to or greater than the monitoring cycle (step S3002: YES), the voice-communication state determining unit 134 measures the volume of accumulated data in the reception buffer 131 (step S3003) and determines whether the voice-communication state stored in memory at the previous determination of the voice-communication state, is "sound" (step S3004).

At step S3004, if the voice-communication state is "sound" (step S3004: YES), the voice-communication state determining unit 134 determines whether the volume of accumulated data measured at step S3003 is at most a threshold (step S3005). If the volume of accumulated data is not less than or equal to the threshold (step S3005: NO), the voice-communication state determining unit 134 proceeds to step S3009 and continues processing therefrom.

At step S3005, if the volume of accumulated data measured at step S3003 is less than or equal to the threshold (step S3005: YES), the voice-communication state determining unit 134 increments the counter k (k=k+1) (step S3006) and determines whether the counter k is greater than a protective-step count (step S3007).

At step S3007, if the counter k is not greater than the protective-step count (step S3007: NO), the voice-communication state determining unit 134 returns to step S3002 and continues processing therefrom. If the counter k is greater than the protective-step count (step S3007: YES), the voice-communication state determining unit 134 updates the voice-communication state stored in the memory, to "silence" (step S3008) and sets the counter k to 0 (step S3009), ending the series of operations.

At step S3004, if the voice-communication state is not "sound" (step S3004: NO), the voice-communication state determining unit 134 determines whether the accumulated data volume measured at step S3003 is greater than the threshold (step S3010). If the accumulated data volume is not greater than the threshold (step S3010: NO), the voice-communication state determining unit 134 proceeds to step S3014 and continues processing therefrom.

At step S3010, if the accumulated data volume measured at step S3003 is greater than the threshold (step S3010: YES), the voice-communication state determining unit 134 increments the counter k (k=k+1) (step S3011) and determines whether the counter k is greater than the protective-step count (step S3012).

At step S3012, if the counter k is not greater than the protective-step count (step S3012: NO), the voice-communication state determining unit 134 returns to step S3002 and continues processing therefrom. If the counter k is greater than the protective-step count (step S3012: YES), the voice-communication state determining unit 134 updates the voice-communication state stored in the memory, to "sound" (step S3013) and sets the counter k to 0 (step S3014), ending the series of operations.

In this manner, the voice-communication state determining unit 134 disregards cases when the value of the counter k is less than the protective-step count, even if the volume of accumulated data is less than or equal to the threshold at step S3005. As a result, if the volume of accumulated data in the reception buffer 131 is less than or equal to the threshold for a given period or longer, the voice-communication state determining unit 134 is able to determine that the voice-communication state is "silence".

Further, the voice-communication state determining unit 134 disregards cases when the value of the counter k is less than the protective-step count, even if the accumulated data volume is greater than the threshold at step S3010. As a result, if the volume of accumulated data in the reception buffer 131 is greater than the threshold for the given period or longer, the voice-communication state determining unit 134 is able to determine that the voice-communication state is "sound".

Figure 31:
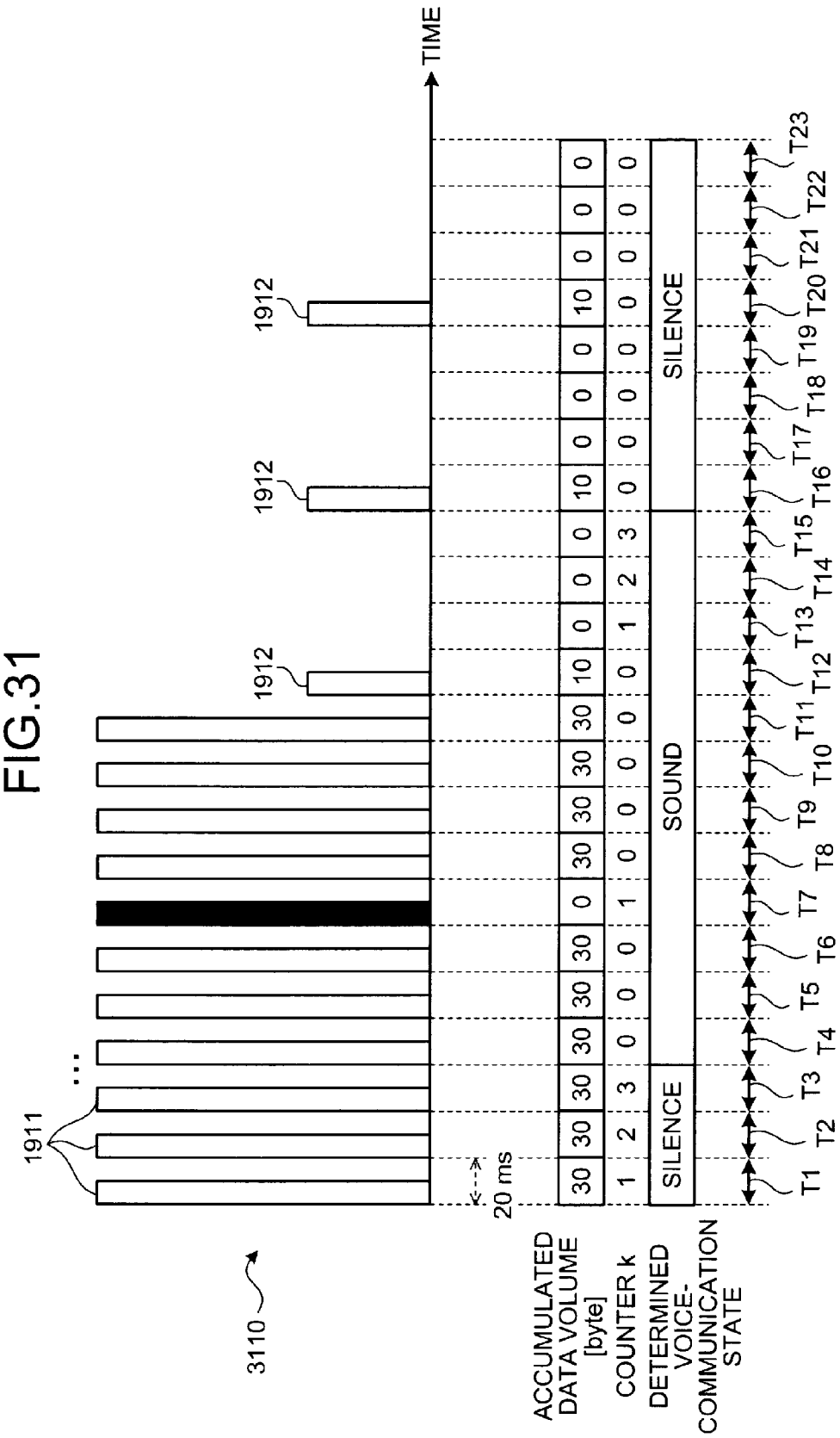
FIG. 31 is a diagram of an example of voice-communication state determination by the operations depicted in FIG. 30.

FIG. 31 is a diagram of an example of voice-communication state determination by the operations depicted in FIG. 30. In FIG. 31, parts identical to those depicted in FIG. 19 are given the same reference numerals used in FIG. 19 and description thereof is omitted. In FIG. 31, the horizontal axis represents time. Reference numeral 3110 represents audio data transmitted from the transmission node 200 to the reception node 100.

Here, the initial voice-communication state is assumed to be "silence", the monitoring cycle is assumed to be 20[ms], the threshold (corresponds to size of SID data 1912) is assumed to be 10[bytes], and the protective-step count is assumed to be 3. The reception node 100 acquires the volume of accumulated data in the reception buffer 131 during the monitoring cycle 20[ms] and if the accumulated data volume exceeds the threshold of 10[bytes], the reception node 100 increments the counter k. Monitoring cycles T1-T23 are the monitoring cycles (20[ms]) in the reception node 100.

In the monitoring cycles T1-T6, it is assumed that the reception node 100 properly receives the AMR data 1911 (size of 30[bytes]) 6 times consecutively during the 20[ms]-cycles. At each of the monitoring cycles T1-T3, since the voice-communication state stored in the memory is "silence" and the accumulated data volume is 30[bytes], which is greater than the threshold of 10[bytes], the reception node 100 increments the counter k (k=1, 2, 3).

In the monitoring cycles T1-T3, since the value of the counter k is less than or equal to the protective-step count of 3, the reception node 100 determines that the voice-communication state is still "silence". As a result, in the monitoring cycles T1-T3, the voice-communication state is determined to be "silence".

In the monitoring cycle T4, since the voice-communication state is "silence" and the accumulated data volume is 30[bytes], which exceeds the threshold of 10[bytes], the reception node 100 increments the counter k (k=4). At the monitoring cycle T4, since the value of the counter k exceeds the protective-step count of 3, the reception node 100 determines that the voice-communication state has changed to "sound". The reception node 100 further initializes the counter k to 0 (k=0).

In the monitoring cycles T5-T6, since the voice-communication state stored in the memory is "sound" and the accumulated data volume is 30[bytes], which is not less than or equal to the threshold of 10[bytes], the reception node 100 does not increment the counter k (k=0).

In the monitoring cycle T7, it is assumed that the reception node 100 cannot properly receive the AMR data 1911. In the monitoring cycle T7, since the voice-communication state stored in the memory is "sound" and the accumulated data volume is 0[bytes], which is less than or equal to the threshold of 10[bytes], the reception node 100 increments the counter k (k=1). In the monitoring cycle T7, since the value of the counter k (k=1) is less than the protective-step count of 3, the reception node 100 determines that the voice-communication state is still "sound".

In the monitoring cycles T8-T11, it is assumed that the reception node 100 properly receives the AMR data 1911 4 times consecutively. In the monitoring cycles T8-T11, since the voice-communication state stored in the memory is "sound" and the accumulated data volume is 30[bytes], which is not less than or equal to the threshold of 10[bytes], the reception node 100 does not increment the counter k (k=0).

In the monitoring cycle T12 and thereafter, it is assumed that the actual voice-communication state of the audio data transmitted from the transmission node 200 to the reception node 100 is "silence". It is assumed that in each of the monitoring cycles T12, T16, T20, the reception node 100 properly receives the SID data 1912 (size of 10[bytes]).

In the monitoring cycles T12-T15, since the voice-communication state stored in the memory is "sound" and the accumulated data volume is 10 or 0[bytes], which is less than or equal to the threshold of 10[bytes], the reception node 100 increments the counter k (k=1, 2, 3). During the interval between the monitoring cycles T12-T15, since the value of the counter k is less than or equal to the protective-step count of 3, the reception node 100 determines that the voice-communication state is still "sound".

In the monitoring cycle T16, since the voice-communication state is "sound" and the accumulated data volume is 10[bytes], which is less than or equal to the threshold of 10[bytes], the reception node 100 increments the counter k (k=4). In the monitoring cycle T16, since the value of the counter k exceeds the protective-step count of 3, the reception node 100 determines that the voice-communication state has changed to "silence". The reception node 100 further initializes the counter k to 0 (k=0).

In the monitoring cycles T17-T23, since the voice-communication state stored in the memory is "silence" and the accumulated data volume is 10[bytes] or 0[bytes], which is less than or equal to the threshold of 10[bytes], the reception node 100 does not increment the counter k (k=0).

In this manner, even if the accumulated data volume is less than or equal to the threshold at monitoring cycle T7, the voice-communication state determining unit 134 disregards cases where the value of the counter k does not exceed the protective-step count. As a result, if the reception node 100 cannot properly receive the AMR data 1911, errant determination that the voice-communication state has changed to "silence" can be prevented.

In this manner, according to the reception node 100 (receiving apparatus) of the fifth embodiment, the voice-communication state is determined and according to the determined voice-communication state, the ROHC operation mode can be changed. Consequently, when the voice-communication state is "sound", sound quality can be improved and when the voice-communication state is "silence", efficient head compression can be facilitated. As a result, the sound quality of audio data and band utilization efficiency can be improved.

Further, if the volume of accumulated data in the reception buffer 131 is greater than the threshold for the given period or longer, the voice-communication state is determined to be "sound", whereby errant determination that the voice-communication state has changed to "sound" due to instantaneous traffic increases, can be prevented.

If the volume of accumulated data in the reception buffer 131 is less than or equal to the threshold for the given period or longer, the voice-communication state is determined to be "silence", whereby errant determination that the voice-communication state has changed to "sound" due to instantaneous traffic decreases caused by missing frames, can be prevented.

In the fifth embodiment, the configurations of the reception node 100 and the transmission node 200 have been described to be the configurations depicted in FIG. 1 and FIG. 2 (first embodiment). However, the configurations of the reception node 100 and the transmission node 200 may be identical to those of any one of the second to fourth embodiments. As one example, a case in which the configurations of the reception node 100 and the transmission node 200 are identical to the configurations depicted in FIG. 22 and FIG. 23 (third embodiment) will be described.

In this case, if the volume of accumulated data in the transmission buffer 211 is greater than the threshold for the given period or longer, the voice-communication state determining unit 2310 of the transmission node 200 determines that the voice-communication state is "sound". Further, if the data accumulated in the transmission buffer 211 is less than or equal to the threshold for the given period or longer, the voice-communication state determining unit 2310 determines that the voice-communication state is "silence".

In the first to the fifth embodiments, a configuration in which the ROHC control unit 135 is disposed in the reception node 100 and ROHC switching control is performed by the reception node 100 has been described. In contrast, in a sixth embodiment, a function corresponding to the ROHC control unit 135 is provided to the transmission node 200 and the ROHC switching control is performed by the transmission node 200.

Figure 32:
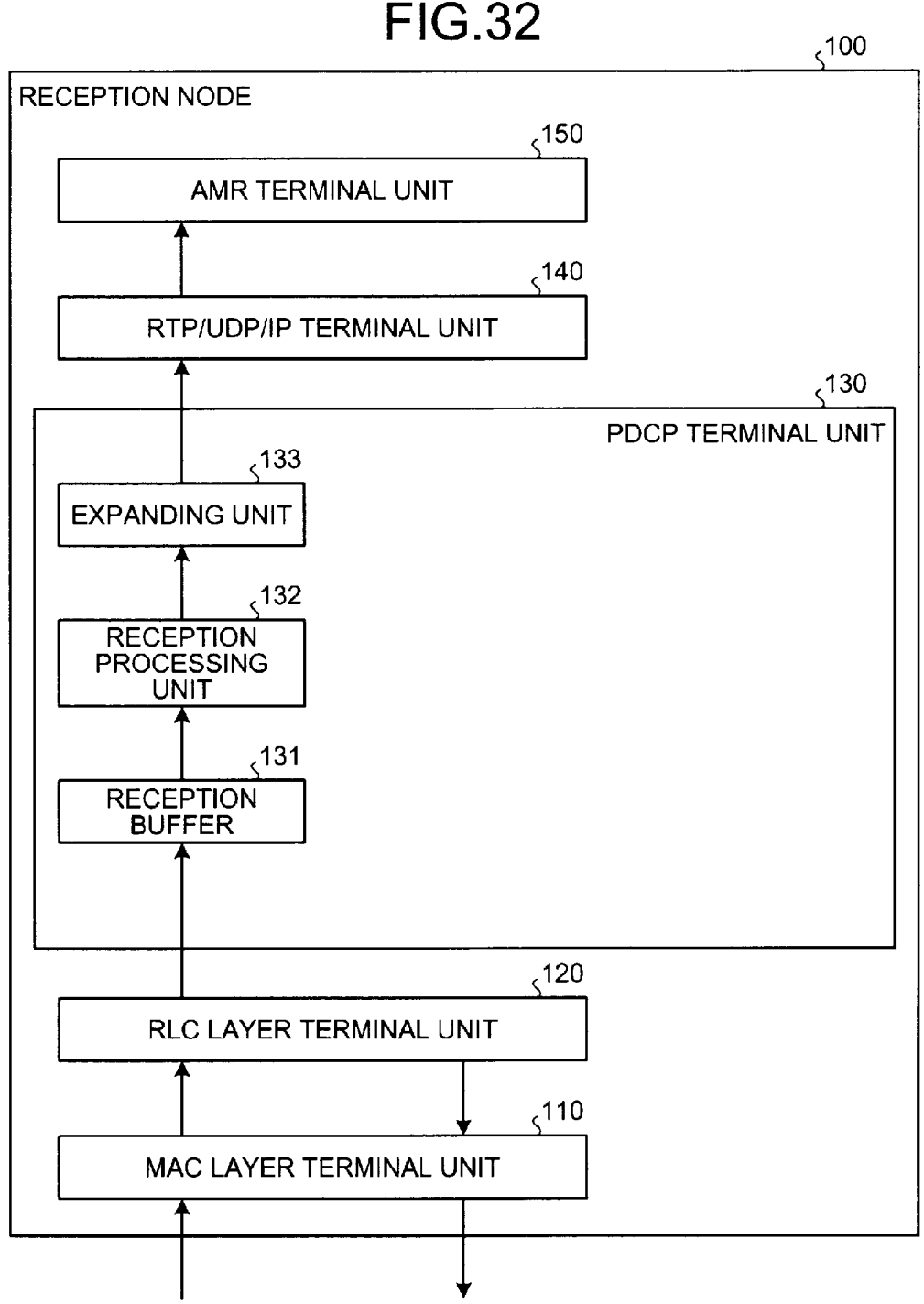
FIG. 32 is a block diagram of an example of configuration of the reception node according to a sixth embodiment.

FIG. 32 is a block diagram of an example of configuration of the reception node according to the sixth embodiment. In FIG. 32, parts identical to those depicted in FIG. 22 are given the same reference numerals used in FIG. 22 and description thereof is omitted. In the reception node 100 according to the sixth embodiment, the ROHC control unit 135 and the transmission processing unit 136 depicted in FIG. 22 may be omitted.

Figure 33:
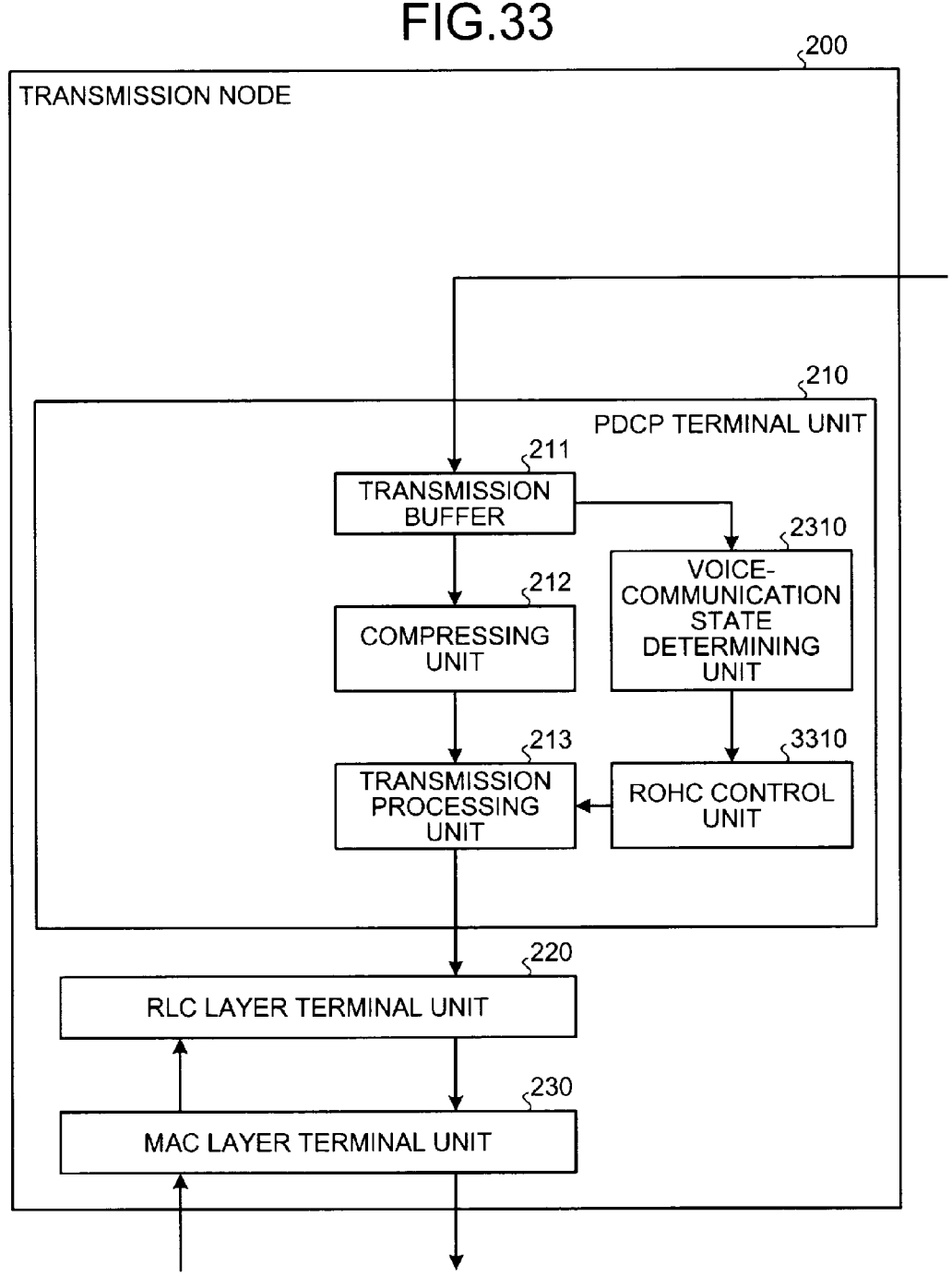
FIG. 33 is a block diagram of an example of configuration of the transmission node according to the sixth embodiment.

FIG. 33 is a block diagram of an example of configuration of the transmission node according to the sixth embodiment.

In FIG. 33, parts identical to those depicted in FIG. 23 are given the same reference numerals used in FIG. 23 and description thereof is omitted. As depicted in FIG. 33, the PDCP terminal unit 210 of the transmission node 200 according to the sixth embodiment includes an ROHC control unit 3310 in addition to the configuration depicted in FIG. 23.

Further, in the transmission node 200 according to the sixth embodiment, the reception processing unit 214 depicted in FIG. 23 may be omitted. The voice-communication state determining unit 2310 outputs to the ROHC control unit 3310, voice-communication state information that indicates voice-communication state determination results.

The ROHC control unit 3310 (control unit) changes the ROHC operation mode for the reception node 100 and the transmission node 200, according to the determination results output from the voice-communication state determining unit 2310. To change the ROHC operation mode, the ROHC control unit 3310 notifies the compressing unit 212 of the operation mode to be changed to.

Further, the ROHC control unit 3310 generates a change instructing signal that indicates the operation mode to be changed to. The ROHC control unit 3310 outputs the generated change-instructing signal to the transmission processing unit 213, whereby the change instructing signal is transmitted to the reception node 100 and the ROHC operation mode is changed. Changing of the ROHC operation mode by the ROHC control unit 3310 is identical to that by the ROHC control unit 135 described above and description thereof is omitted.

The compressing unit 212 depicted in FIG. 33 writes header compressed audio data to memory (not depicted) of the transmission node 200. The compressing unit 212, for example, is a computing unit such as a CPU. The transmission processing unit 213 reads out the audio data stored to the memory of the transmission node 200 by the compressing unit 212 and transmits the audio data.

The voice-communication state determining unit 2310 writes the voice-communication state determination results to the memory (not depicted) of the transmission node 200. The voice-communication state determining unit 2310 is, for example, a computing unit such as a CPU. The ROHC control unit 3310 reads out the determination results stored to the memory of the transmission node 200 by the voice-communication state determining unit 2310 and according to the determination results, changes the ROHC operation mode. The ROHC control unit 3310 is, for example, a computing unit such as a CPU.

In this manner, according to the transmission node 200 (transmitting apparatus) of the sixth embodiment, the voice-communication state is determined and according to the determined voice-communication state, the ROHC operation state can be changed. Consequently, when the voice-communication state is "sound", sound quality can be improved and when the voice-communication state is "silence", efficient header compression can be facilitated. As a result, the sound quality of audio data and band utilization efficiency can be improved.

Further, in the transmission node 200, the voice-communication state is determined and based on the results, the ROHC operation mode can be changed, whereby the voice-communication state can be accurately determined, irrespective of the wireless interval quality. Further, since the voice-communication state determination and the changing of the ROHC operation mode is performed on the transmission node 200 side, the processing load on the reception node 100 side can be reduced.

Figure 34:
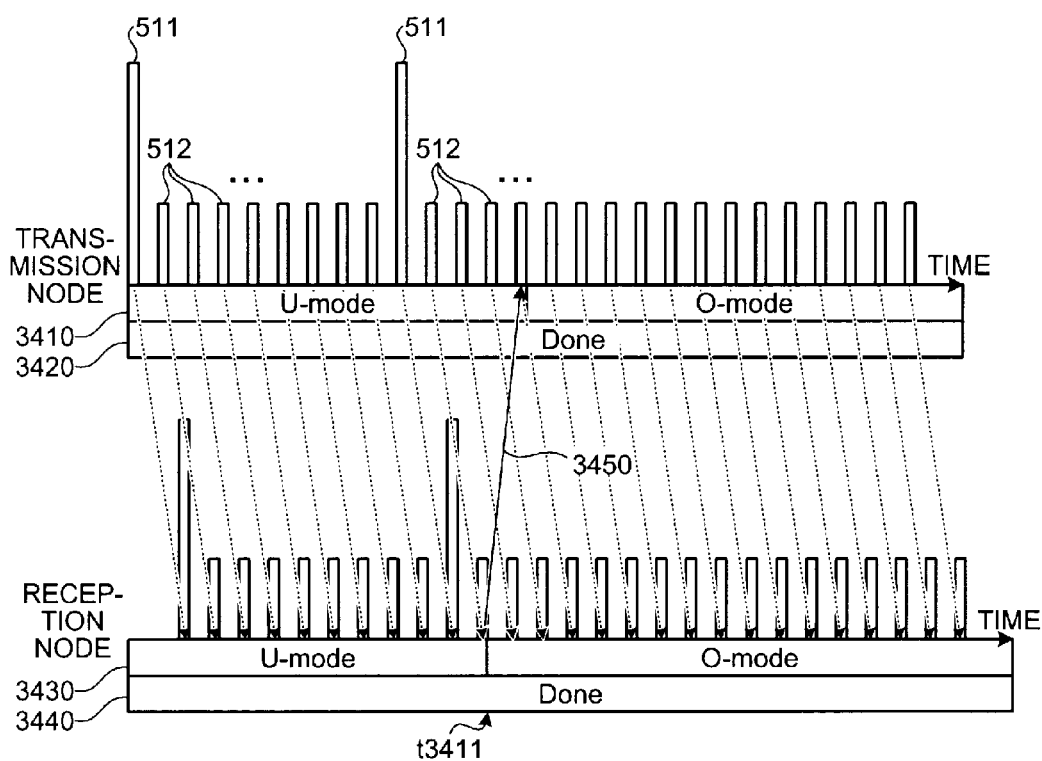
FIG. 34 is a diagram of an example of switching from the U-mode to the O-mode.

FIG. 34 is a diagram of an example of switching from the U-mode to the O-mode. In FIG. 34, parts identical to those depicted in FIG. 5 are given the same reference numerals and description thereof is omitted. C_MODE 3410 indicates the ROHC operation mode set in the compressing unit 212 of the transmission node 200.

The C_MODE 3410 indicates any one among "U-mode", "O-mode", and "R-mode". C_TRANS 3420 indicates the transition state of the ROHC operation mode in the compressing unit 212 of the transmission node 200. The C_TRANS 3420 indicates any one among "Pending" and "Done".

D_MODE 3430 indicates the ROHC operation mode set in the expanding unit 133 of the reception node 100. The D_MODE 3430 indicates any one of "U-mode", "O-mode", and "R-mode". D_TRANS 3440 indicates the transition state of the ROHC operation mode set in the expanding unit 133 of the reception node 100. The D_TRANS 3440 indicates any one among "Initiated", "Pending", and "Done".

Switching from the U-mode to the O-mode can be performed at an arbitrary timing, if a feedback channel is available from the reception node 100 to the transmission node 200. For example, during the interval before period t3411, it is assumed that the ROHC operation mode of the reception node 100 and the transmission node 200 is the U-mode.

During period t3411, the reception node 100 transmits to the transmission node 200, a change instructing signal 3450 that indicates that the ROHC operation mode is to be changed to the O-mode. The transmission node 200, upon receiving the change instructing signal 3450 from the reception node 100, changes the ROHC operation mode in the transmission node 200 to the O-mode.

For example, the transmission node 200 suspends the cyclic transmission of the uncompressed frames 511 and transmits the compressed frame 512 until a Nack is received from the reception node 100. In switching from the U-mode to the O-mode, since the switch can be performed at an arbitrary timing in the reception node 100 and the transmission node 200, the switch can be performed with the C_TRANS 3420 and the D_TRANS 3440 as is, indicating "Done".

Figure 35:
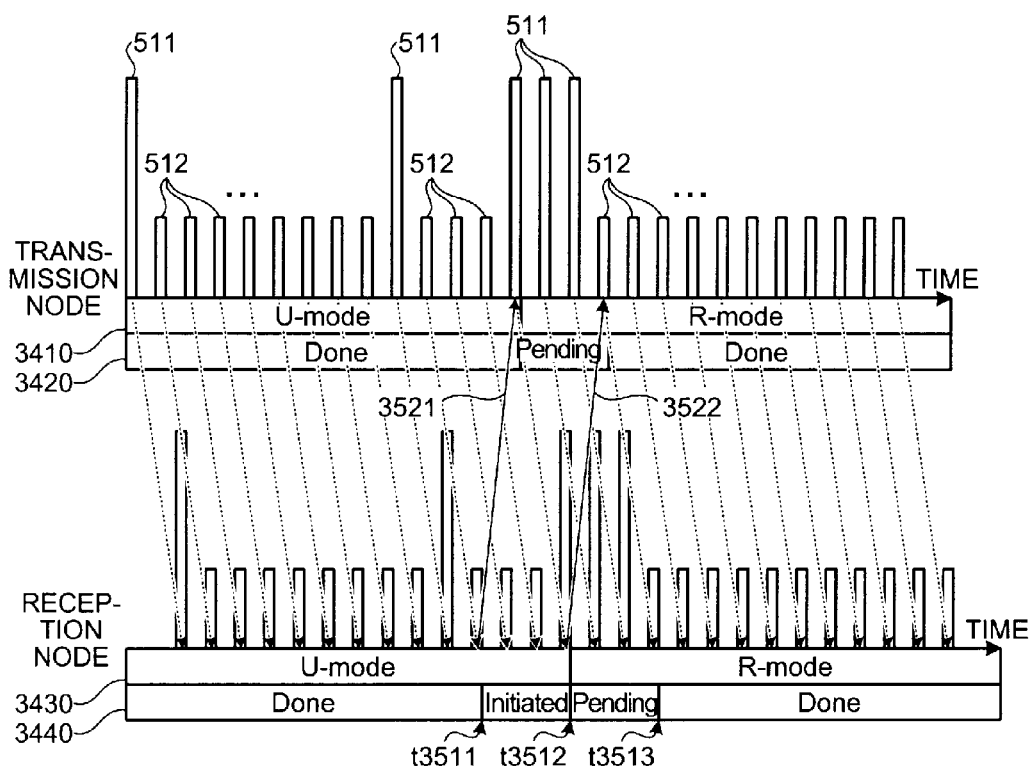
FIG. 35 is a diagram of an example of switching from the U-mode to the R-mode.

FIG. 35 is a diagram of an example of switching from the U-mode to the R-mode. In FIG. 35, parts identical to those depicted in FIG. 34 are given the same reference numerals used in FIG. 34 and description thereof is omitted. The switch from the U-mode to the R-mode is performed after at least 1 uncompressed frame 511 has been received properly. For example, during the interval before period t3511, the ROHC operation mode of the reception node 100 and the transmission node 200 is assumed to be the U-mode.

During period t3511, the reception node 100 transmits to the transmission node 200, a change instructing signal 3521 that indicates that the ROHC operation mode is to be changed to the R-mode. The transmission node 200, upon receiving the change instructing signal 3521 from the reception node 100, changes the operation mode to the R-mode and continues to transmit the uncompressed frame 511 to the reception node 100.

The reception node 100, upon receiving the uncompressed frame 511 transmitted from the transmission node 200, changes the ROHC operation mode in the reception node 100 to the R-mode. During the interval from the period t3511 when the reception node 100 transmits the change instructing signal 3521 until the period t3512 when the reception node 100 receives the uncompressed frame 511 transmitted from the transmission node 200, the D_TRANS 3440 indicates "Initiated".

Further, during the period t3512, if the reception node 100 properly receives the uncompressed frame 511 transmitted from the transmission node 200, the reception node 100 transmits an Ack 3522 to the transmission node 200. Upon receiving the ACK 3522, the transmission node 200 continues to transmit the compressed frame 512 to the reception node 100, until a Nack is received from the reception node 100.

During the interval from when the transmission node 200 changes the ROHC operation mode to the R-mode until the transmission node 200 receives the Ack 3522, the C_TRANS 3420 indicates "Pending". Further, the D_TRANS 3440 indicates "Pending" during the interval from the period t3512 when the reception node 100 transmits the Ack 3522 until the period t3513 when the reception node 100 receives the compressed frame 512.

Figure 36:
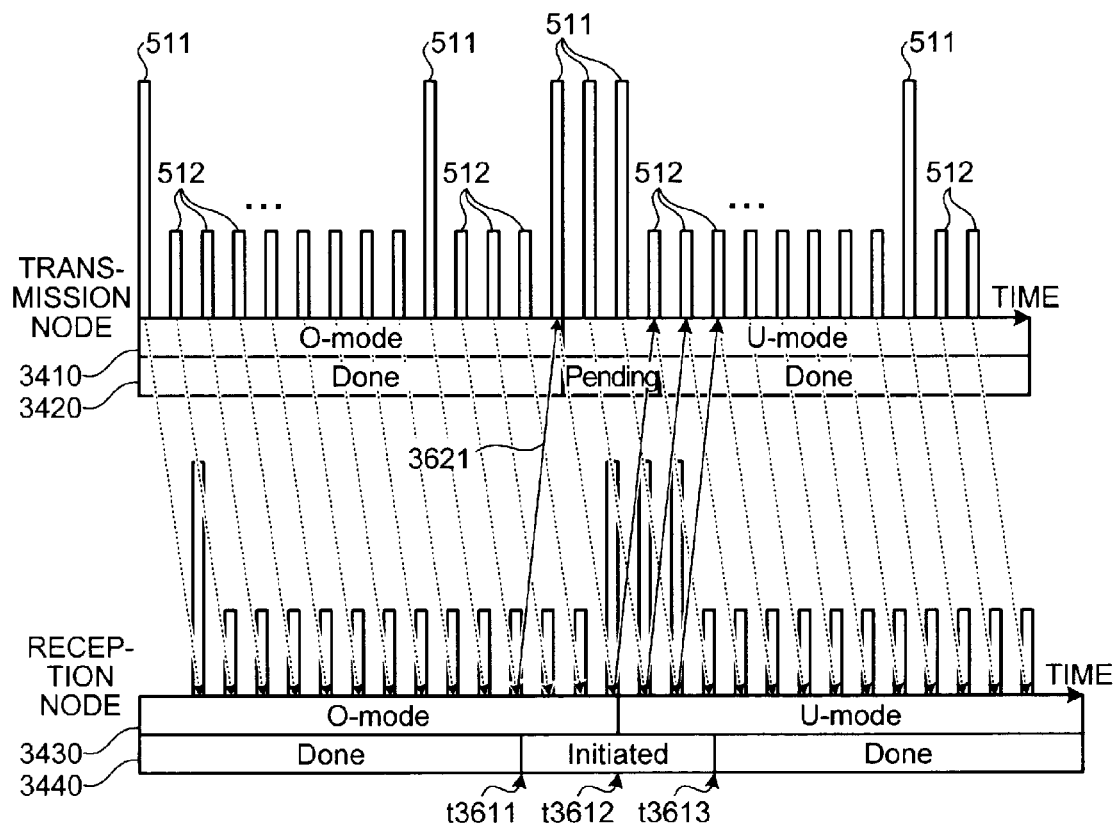
FIG. 36 is a diagram of an example of switching from the O-mode to the U-mode.

FIG. 36 is a diagram of an example of switching from the O-mode to the U-mode. In FIG. 36, parts identical to those depicted in FIG. 34 are given the same reference numerals used in FIG. 34 and description thereof is omitted. The switch from the O-mode to the U-mode can be performed at an arbitrary timing. For example, during an interval before period t3611, the ROHC operation mode of the reception node 100 and the transmission node 200 is assumed to be the O-mode.

At the period t3611, the reception node 100 transmits to the transmission node 200, a change instructing signal 3621 that indicates that the ROHC operation mode is to be changed to the U-mode. The transmission node 200, upon receiving the change instructing signal 3621 from the reception node 100, changes the ROHC operation mode in the transmission node 200 to the U-mode.

For example, the transmission node 200 starts the cyclic transmission of the uncompressed frame 511. Further, configuration may be such that when the transmission node 200 changes the ROHC operation mode to the U-mode, the transmission node 200 transmits the uncompressed frame 511 3 times consecutively and receives from the reception node 100, Acks in response to the uncompressed frames 511. Consequently, it can be confirmed that the operation mode switch was performed properly (Three-way handshake).

At period t3612 when the reception node 100 receives the uncompressed frame 511 from the transmission node 200, after having transmitted the change instructing signal 3621 thereto, the reception node 100 changes the ROHC operation mode to the U-mode. The D_TRANS 3440 indicates "Initiated" during the interval from the period t3611 when the reception node 100 transmits the change instructing signal 3621 until the period t3613 when the reception node 100 receives the compressed frame 512 from the transmission node 200. The switch from the R-mode to the U-mode is identical to the switch from the O-mode to the U-mode and description thereof is omitted.

As described, according to the receiving apparatus, transmitting apparatus, receiving method, transmitting method, communications system, and communication method, the voice-communication state is determined and according to the determined voice-communication state, the ROHC operation mode can be changed. Consequently, when the voice-communication state is "sound", the sound quality can be improved and when the voice-communication state is "silence", efficient header compression can be facilitated. Therefore, the sound quality of audio data and band utilization efficiency can be improved.

In each of the embodiments, although a configuration for an LTE system has been described, the receiving apparatus, transmitting apparatus, receiving method, transmitting method, communications system, and communication method are further applicable to other communications system, such as WiMAX.

Further, in the embodiments, a configuration is described in which the ROHC operation mode is changed to the O-mode or the R-mode when the voice-communication state is "sound" and the ROHC operation mode is changed to the U-mode when the voice-communication state is "silence". On the contrary, configuration may be such that when the voice-communication state is "sound", the ROHC operation mode is changed to the R-mode and when the voice-communication state is "silence", the ROHC operation mode is changed to the O-mode.

Typically, since the O-mode has a higher header compression frequency that the R-mode, the efficiency of header compression is favorable. Therefore, by changing the ROHC operation mode to the O-mode when the voice-communication state is "silence", header compression efficiency can be improved. Concerning other operation modes for header compression, without limitation to the ROHC U-mode, O-mode and R-mode, various types of operation modes having different header compression frequencies can be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving apparatus in a communications system that performs header compression of audio data and has a plurality of operation modes that each have a different frequency of header compression, the receiving apparatus comprising:
   a receiver that receives the audio data, which is transmitted from a transmitting apparatus that performs the header compression;
   a processor that controls the receiving apparatus in accordance with the process comprising:
   determining a voice-communication state of the received audio data; and
   changing the operation mode, according to a determination result.

2. The receiving apparatus according to claim 1, wherein the processor determines the voice-communication state, based on the volume of accumulated data in a reception buffer that stores the received audio data.

3. The receiving apparatus according to claim 2, wherein the processor determines the voice-communication state to be sound, if the volume of accumulated data in the reception buffer is greater than a threshold.

4. The receiving apparatus according to claim 3, wherein the processor changes the operation mode to an operation mode having a low frequency of header compression, among the operation modes, if the processor determines the voice-communication state to be sound and changes the operation mode to an operation having a high frequency of header compression, among the operation modes, if the processor determines the voice-communication state to be silence.

5. The receiving apparatus according to claim 3, wherein the processor determines the voice-communication state to be sound, if the volume of accumulated data in the reception buffer is greater than the threshold for a given period or longer.

6. The receiving apparatus according to claim 3, wherein the processor determines the voice-communication state to be silence, if the volume of accumulated data in the reception buffer is less than or equal to the threshold for a given period or longer.

7. The receiving apparatus according to claim 1, wherein
   the receiver receives from the transmitting apparatus, data volume information that indicates the volume of accumulated data stored in a transmission buffer of the transmitting apparatus, and
   the processor determines the voice-communication state, based on the received data volume information.

8. The receiving apparatus according to claim 1, wherein
   the receiver receives from the transmitting apparatus, voice-communication state information that indicates the voice-communication state determined by the transmitting apparatus, and
   the processor changes the operation mode, according to the received voice-communication state information.

9. The receiving apparatus according to claim 1, wherein
   the processor is a computing unit that writes the determination result to memory, reads out the determination result and changes the operation mode, according to the read determination result.

10. A transmitting apparatus in a communications system that performs header compression of audio data and has a plurality of operation modes that each have a different frequency of header compression, the transmitting apparatus comprising:
    a transmitter that transmits the audio data that has been subjected to a header;
    a processor that controls the transmitting apparatus in accordance with the process comprising:
    compressing the header of the audio data;
    determining a voice-communication state of the audio data transmitted by the transmitter; and
    changing the operation mode, according to a determination result.

11. The transmitting apparatus according to claim 10, wherein
    the transmitter reads out the audio data written to the memory by the processor and transmits the read audio data,
    the processor is a computing unit that writes to memory, the audio data that has been subjected to the header, writes the determination result to the memory, reads out the determination result and changes the operation mode, according to the read determination result.

12. A receiving method in a communications system that performs header compression of audio data and has a plurality of operation modes that each have a different frequency of header compression, the receiving method comprising:
    receiving the audio data, which is transmitted from a transmitting apparatus that performs the header compression;
    determining a voice-communication state of the received audio data; and
    changing the operation mode, according to a determination result obtained at the determining.

13. A transmitting method in a communications system that performs header compression of audio data and has a plurality of operation modes that each have a different frequency of header compression, the transmitting method comprising:

transmitting the audio data that has been subjected to a header;
compressing the header of the audio data;
determining a voice-communication state of the audio data transmitted at the transmitting; and
changing the operation mode, according to a determination result obtained at the determining.

14. A communications system that performs header compression of audio data and has a plurality of operation modes that each have a different frequency of header compression, the communications system comprising:
   a transmitter that transmits the audio data that has been subjected to a header;
   a receiver that receives the audio data transmitted by the transmitter;
   a processor that compresses the header of the audio data, determines a voice-communication state of the audio data received by the receiver, and changes the operation mode, according to a determination result.

15. A communication method of a communications system that performs header compression of audio data and has a plurality of operation modes that each have a different frequency of header compression, the communication method comprising:
   transmitting the audio data that has been subjected to a header;
   receiving the audio data transmitted at the transmitting;
   compressing the header of the audio data;
   determining a voice-communication state of the audio data received at the receiving; and
   changing the operation mode, according to a determination result obtained at the determining.

* * * * *